(12) United States Patent
Mizoguchi et al.

(10) Patent No.: US 9,436,413 B2
(45) Date of Patent: Sep. 6, 2016

(54) INFORMATION PROCESSING APPARATUS, INFORMATION PROCESSING METHOD, AND STORAGE MEDIUM STORING PROGRAM

(71) Applicant: CANON KABUSHIKI KAISHA, Tokyo (JP)

(72) Inventors: Yoshinori Mizoguchi, Tokyo (JP); Tomohiro Suzuki, Kawasaki (JP); Kiyoshi Umeda, Kawasaki (JP); Naoki Sumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/741,958

(22) Filed: Jun. 17, 2015

(65) Prior Publication Data
US 2015/0379382 A1 Dec. 31, 2015

(30) Foreign Application Priority Data

Jun. 30, 2014 (JP) ................................. 2014-135177

(51) Int. Cl.
G06F 3/12 (2006.01)
G06K 15/02 (2006.01)

(52) U.S. Cl.
CPC ....................... G06F 3/12 (2013.01)

(58) Field of Classification Search
None
See application file for complete search history.

(56) References Cited

U.S. PATENT DOCUMENTS

2003/0005050 A1* 1/2003 Pineau ................... G06Q 30/02
709/203

2015/0095643 A1* 4/2015 Adams ................ G06F 21/6218
713/165

FOREIGN PATENT DOCUMENTS

JP 2013-080470 A 5/2013

OTHER PUBLICATIONS

U.S. Appl. No. 14/727,182, filed Jun. 1, 2015, Applicants: Tomohiro Suzuki, et al.
U.S. Appl. No. 14/728,265, filed Jun. 2, 2015, Applicants: Kiyoshi Umeda, et al.
U.S. Appl. No. 14/743,487, filed Jun. 18, 2015, Applicants: Kiyoshi Umeda, et al.
U.S. Appl. No. 14/743,459, filed Jun. 18, 2015, Applicants: Naoki Sumi, et al.
U.S. Appl. No. 14/722,452, filed May 27, 2015, Applicants: Maya Kurokawa, et al.
U.S. Appl. No. 14/741,973, filed Jun. 17, 2015, Applicants: Masaaki Obayashi, et al.
U.S. Appl. No. 14/740,678, filed Jun. 16, 2015, Applicants: Fumitaka Goto, et al.
U.S. Appl. No. 14/740,752, filed Jun. 16, 2015, Applicants: Hiroyasu Kunieda, et al.
U.S. Appl. No. 14/730,985, filed Jun. 4, 2015, Applicants: Masao Kato, et al.

* cited by examiner

*Primary Examiner* — Dov Popovici
(74) *Attorney, Agent, or Firm* — Fitzpatrick, Cella, Harper & Scinto

(57) ABSTRACT

When performing image processing on a designated image by the function of the application, image data of the designated image is obtained in a second layer constituted by an instruction set executable by a processor. In a first layer constituted by a script instruction set, the print script of print content including the image data which has been obtained and converted into a data format interpretable by the first layer in the second layer is generated. The print script is rendered into print image data corresponding to a print resolution by interpreting the generated print script.

20 Claims, 22 Drawing Sheets

INFORMATION PROCESSING APPARATUS, INFORMATION PROCESSING METHOD, AND STORAGE MEDIUM STORING PROGRAM

BACKGROUND OF THE INVENTION

1. Field of the Invention

The present invention relates to an information processing apparatus and information processing method for performing image processing, and a storage medium storing a program.

2. Description of the Related Art

In recent years, multi-function mobile phones (to be referred to as mobile computers hereinafter) incorporating a camera function have become widespread, and far surpass digital cameras and conventional personal computers (to be referred to as PCs hereinafter) in sales. The system of such a mobile computer is basically formed from three elements, that is, hardware as the computer itself, an operating system (to be referred to as an OS hereinafter) operating on the hardware, and an application operating on the OS. The user can activate a map, mail, or browser by using the application, and perform an operation such as browsing of a Web site on the Internet. As examples of the form of such an application operating on the mobile computer, there are mainly two application forms, that is, a native application and a Web application. The features of each application will be explained below.

The native application is normally developed in a development environment and development language which are prepared for each OS. For example, the C/C++ language is used on an OS provided by company A, the Java® language is used on an OS provided by company B, and a different development language is used on an OS provided by company C. In this way, the native application is developed in a different development language for each OS. The native application is compiled (translated) in advance in each development environment, and converted by an assembler from a so-called high-level language understandable by a human into instruction sets interpretable by the CPU of the computer. Thus, the native application has an advantage that a high-speed operation is possible because the CPU directly interprets instructions.

The Web application is an application operating on a Web browser which is normally incorporated in an OS on a computer. The Web application is generally developed using a language such as HTML5, CSS, or JavaScript® so as to enable interpretation by the Web browser. These languages are Web standard languages. Thus, once the application is described, it can operate in any environment where the Web browser operates. Japanese Patent Laid-Open No. 2013-80470 discloses an example of the Web application form. The body of the Web application described in HTML5, CSS, or JavaScript resides in a server outside a mobile computer. Since the Web application is downloaded from the server to the mobile computer via Internet connection at the time of use, the user can dynamically change a user interface (UI) design or the like without compiling the application in advance.

Recently, various kinds of OSs are used as the mobile computers have become widespread. Hence, an important challenge in software development is how to develop applications that operate on the OSs in a short time and offer them to users speedily. To solve this problem, a method called cross development is used. Cross development is a method of developing most parts of an application using a common program language cross-sectionally usable for various OSs. Since the program language is common, this method does not require processes for individual development for each OS, and is known as an effective application development method.

Hence, the Web application is a method of solving the above-described problem. However, the Web application operates on the browser and cannot therefore be distributed from application stores run by vendors as a native application. For this reason, a cross development method in a native application style that can be distributed from the stores is becoming necessary.

As one of cross development methods capable of store distribution, a hybrid application as described in Japanese Patent Laid-Open No. 2013-80470 has received attention. In the hybrid application, the application itself is distributed to users as the above-described native application. However, all or most of user interfaces (UIs) are described as a feature in a so-called Web standard language such as HTML5, CSS3, or JavaScript. That is, one application includes a native layer and a script layer using a Web standard language. When such a configuration is employed, it is possible to configure software which makes use of both the advantage of the native application and that of the Web application.

However, when applying the above-described hybrid application to a print application to print a photo or document, the following problems arise.

In a normal hybrid application, a UI portion is described in a Web standard language and held in the application as text data. This text data is called a script. This script is input to an engine (interpreter) used to translate and execute scripts held in the OS when the application is activated. As a result, the UI screen is displayed on the screen of the mobile computer so as to be operable by the user.

Considering a photo print application, for example, the software needs to be built so that a print target photo is drawn on the UI screen and the user can superimpose date information such as a shooting date/time and a stamp such as a pictorial symbol on the photo and print the result. In the hybrid application, drawing of such print content is also described using the Web standard language. To print an image and stamp image drawn on the UI screen, this print content needs to be converted into bitmap data for printing. This processing is called rendering processing.

When performing the rendering processing using the Web standard language, there is generally a constraint which inhibits secondary use of image data held on the script layer side except for screen drawing.

This constraint exists as a constraint imposed when images inside and outside a terminal are handled using the Web standard language. In the HTML, image data can be obtained as an Image object by designating the file path of an image. A memory is reserved using a canvas function, and the Image object can be drawn on the UI screen by the API of the canvas.

However, when image data is obtained by the above-described method, there is a constraint in which it is impossible to extract data from an Image object and perform conversion processing. For example, there is a constraint in which neither the toBlob function nor toDataURL function can be used. This HTML-specific phenomenon is caused by a rule made to prevent secondary use of an image from an external Web site.

In some cases, when the hybrid application is applied to the photo print application, an application function of obtaining and printing image data cannot be implemented owing to the generally present constraint.

SUMMARY OF THE INVENTION

An aspect of the present invention is to eliminate the above-mentioned problems with the conventional technology. The present invention provides an information processing apparatus and information processing method for preventing a failure in executing image processing on obtained image data in a software arrangement including a script layer, and a storage medium storing a program.

The present invention in one aspect provides an information processing apparatus comprising: a processor; a storage unit configured to store a program having a layered structure including a first layer constituted by a script instruction set which is translated to be able to execute the script instruction set by the processor when executing an application and is executed, and a second layer constituted by an instruction set executable by the processor, the program executing the application by cooperation between the first layer and the second layer; an obtaining unit configured to, when performing image processing on a designated image by a function of the application, obtain image data of the designated image in the second layer; a generation unit configured to generate, in the first layer, a print script of print content including the image data which has been obtained by the obtaining unit and converted into a data format interpretable by the first layer in the second layer; and a rendering unit configured to render the print script into print image data corresponding to a print resolution by interpreting the print script generated by the generation unit, wherein the rendering unit generates the print image data by obtaining an output image size based on printing paper information, and enlarging or reducing the image data included in the print script in accordance with the obtained output image size.

The present invention can prevent a failure in executing image processing on obtained image data.

Further features of the present invention will become apparent from the following description of exemplary embodiments with reference to the attached drawings.

DESCRIPTION OF THE EMBODIMENTS

Figure 1:
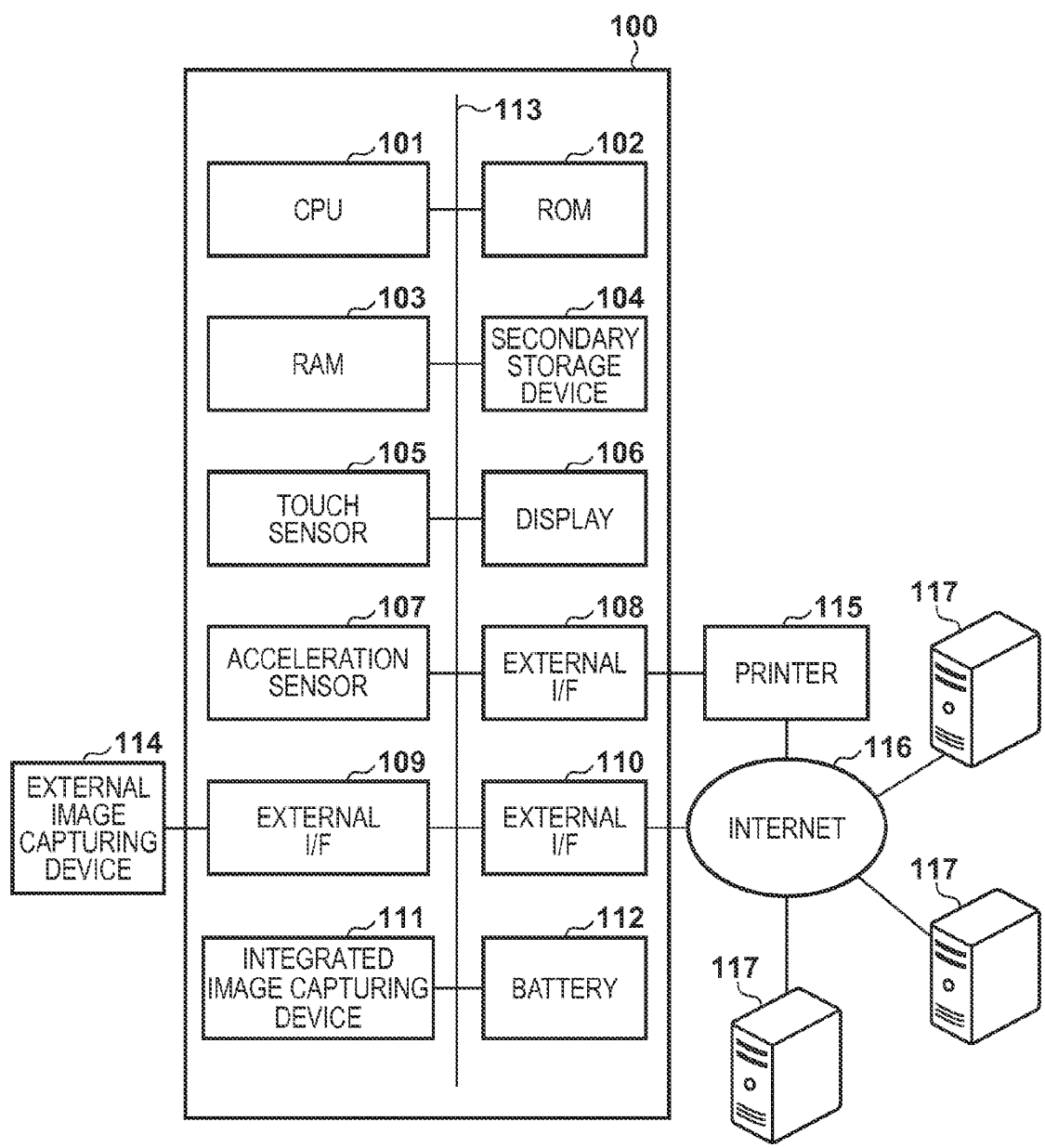
FIG. 1 is a block diagram showing the hardware arrangement of a portable information terminal.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a repetitive description thereof will be omitted.

First Embodiment

An operation when a photo print application as one Web application operates on a portable information terminal will be explained. The photo print application applies various kinds of image processing (for example, the luminance is corrected and a stamp image is added) to an image selected by the user, and then prints the print target content. Note that the photo print application is provided as a hybrid application to be described later in this embodiment.

[Hardware Arrangement]

FIG. 1 is a block diagram showing an example of the hardware arrangement of an information processing apparatus, particularly, a portable information terminal 100. Referring to FIG. 1, a CPU (Central Processing Unit) 101 reads out a program from a ROM 102 to a RAM 103 and executes it, thereby implementing an operation to be described in each embodiment. The ROM 102 is a computer-readable storage medium that stores a program to be executed by the CPU 101, and the like. The RAM 103 is used as a working memory for temporarily storing various data at the time of, for example, executing a program by the CPU 101. A secondary storage device 104 is, for example, a hard disk or a flash memory, and stores, for example, image files, image data, and a database that holds the processing results of image analysis and the like. A touch sensor 105 is a sensor for detecting a touch operation on a touch panel by the user. A display 106 displays a user interface screen such as a print setting screen on the photo print application, an image processing result, and the like. The display 106 may include the touch sensor 105.

An acceleration sensor 107 is a sensor for detecting an acceleration, and detects the tilt of the portable information terminal 100 or the like. An external interface (I/F) 108 connects the portable information terminal 100 to a printer 115. The portable information terminal 100 can use the external I/F 108 to print by the printer 115. The portable information terminal 100 can also use an external I/F 110 to print by the printer 115 via Internet 116. An external I/F 109 connects the portable information terminal 100 to an external image capturing device (camera) 114. Image data captured by the external image capturing device 114 or an integrated image capturing device 111 is stored in the secondary storage device 104 after predetermined image processing. The external I/F 110 includes a wireless LAN and connects the portable information terminal 100 to the Internet 116. The portable information terminal 100 can use the external I/F 110 to obtain image data and the like from various external servers 117 via the Internet 116. A battery 112 supplies power necessary for the operation of the portable information terminal 100. The units ranging from the CPU 101 to the battery 112 are connected to each other via a system bus (control bus/data bus) 113, and the CPU 101 performs overall control of the respective units.

The portable information terminal may include an external I/F for performing wired connection, such as a USB or a wired LAN. The portable information terminal may include an external I/F for performing wireless connection, such as Bluetooth® or infrared communication, in addition to the wireless LAN. As a connection form by the wireless LAN, for example, devices may be directly connected to each other, or a device may be connected to a communication destination device via a wireless LAN router (not shown).

[Software Arrangement]

Figure 2:
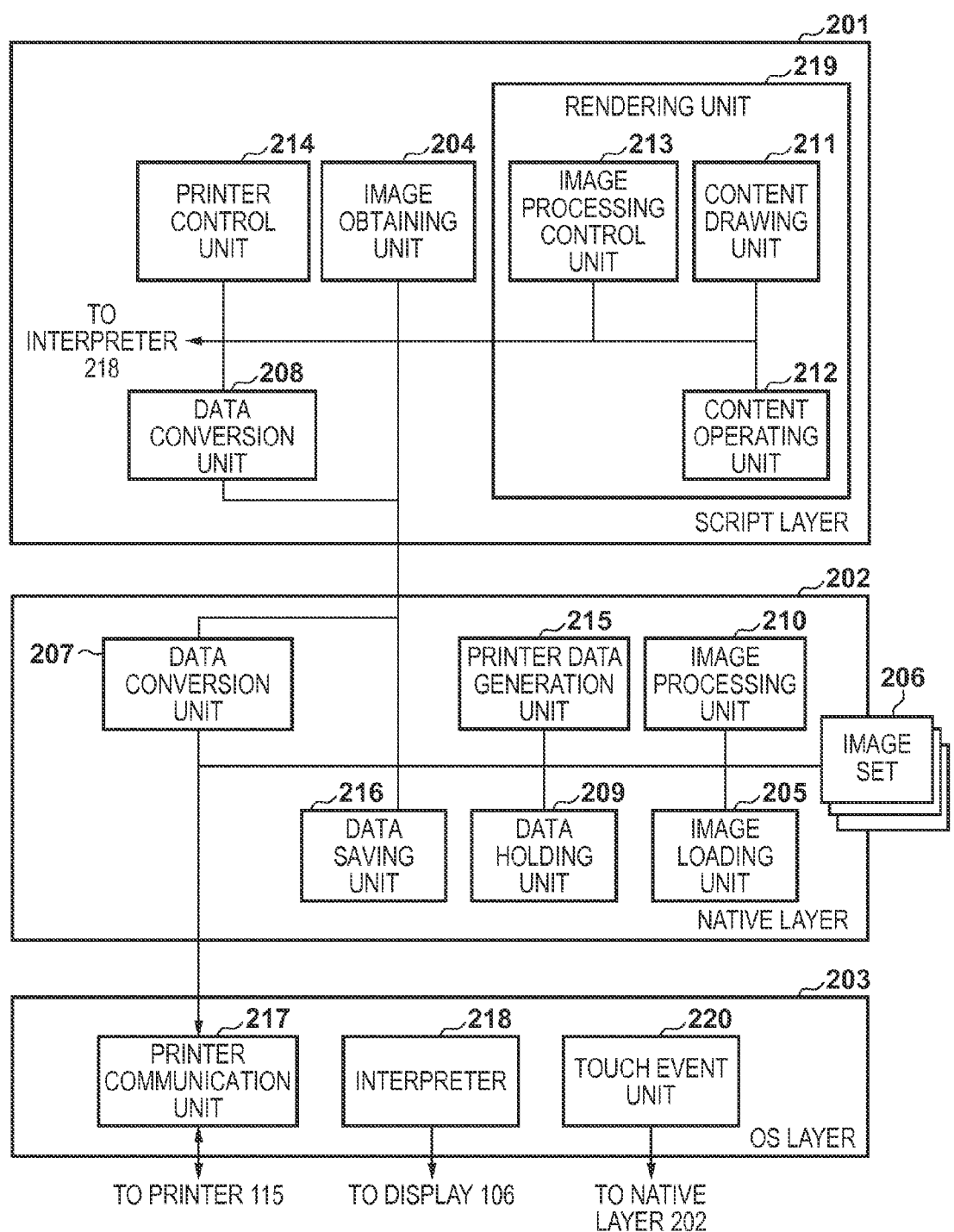
FIG. 2 is a block diagram showing the software arrangement of the portable information terminal.

FIG. 2 is a block diagram showing an example of a software arrangement on the portable information terminal 100 in order to execute the photo print application (to be referred to as the application hereinafter). The CPU 101 implements each block of the software shown in FIG. 2. In this embodiment, the software of the portable information terminal 100 has a three-layered structure of a script layer 201, native layer 202, and OS layer 203. The function of the application is implemented by the cooperation between the respective layers shown in FIG. 2. The script layer 201 describes various instructions (script instruction set) by text data in a Web standard language such as HTML5, CSS (Cascading Style Sheets) 3, or JavaScript. These instructions are instructions such as drawing of content, display of an image, and replay of a moving image. The script layer 201 holds text data of these instructions. The described script is executed by translating a text instruction set by a processor (the CPU 101) present in an application execution environment. The translation is executed in, for example, a form in which instruction sentences are dynamically translated line by line in every execution, a form in which instruction sentences are translated when the application is activated, or a form in which instruction sentences are translated when the application is installed in the portable information terminal 100. Processing in the script layer 201 and content in the script layer 201 will also be simply referred to as a script hereinafter. When the instructions of the script are translated in the device (the portable information terminal 100), for example, the interpreter function of the native layer 202 or OS layer 203 to be described later is used. Note that a large portion of the UI of the application is described by the script in this embodiment.

The native layer 202 is a part which executes a processing instruction set translated (compiled) in advance in an environment other than the application execution environment. In the native layer 202, codes described in a high-level language such as C/C++ are compiled in advance on the server or the PC of the application developer into an ensemble of instructions directly interpretable by the CPU 101. Processing in the native layer 202 and content in the native layer 202, and invocation of the function of the OS layer 203 from the native layer 202 will also be simply referred to as a native hereinafter. Note that another implementation of the native layer 202 is Java. Java is a high-level language similar to C/C++, and is translated in advance into an intermediate code in the development environment at the time of application development. The translated intermediate code operates in the Java virtual environment of each OS. In this embodiment, this form is also one form of the native layer 202.

The OS layer 203 corresponds to the operating system (OS) of the device. The OS layer 203 has an OS-specific function and a role of providing the use of a hardware function to the application. The OS layer 203 includes an API, and the function of the OS layer 203 can be used from the script layer 201 and native layer 202.

In this embodiment, allowing invocation of the function of the native from the script layer 201 will be referred to as binding (or bind). Various native functions include an API, and the script layer 201 can use the native functions by invoking the API. Various OSs incorporate this binding function normally. In this embodiment, an application including both the script layer 201 and native layer 202 will be especially called a hybrid application. In the hybrid application, all or most of the UI is described in a so-called Web standard language such as HTML5, CSS3, or JavaScript, and a function described in a native language can be used from content described in the Web standard language. By installing the hybrid application in the portable information terminal 100, a system which implements the advantages of both the Web application and native application can be built on the portable information terminal 100.

Each block in FIG. 2 will be explained below.

Obtainment of Image Data

An image obtaining unit 204 of the script layer 201 requests the native layer 202 to obtain image data. There are a plurality of obtainment request methods, including, for example, an absolute path designation method of designating the existence location of a file itself, and a method of prompting display of a dialog. Based on the obtainment request from the image obtaining unit 204, an image loading unit 205 of the native layer 202 obtains image data from an image set 206 of the native layer 202 serving as an area where image data are held. The method of obtaining image data from the image set 206 changes depending on the request method of the image obtaining unit 204. For example, the image loading unit 205 directly obtains image data based on the absolute path of a file, or obtains image data based on selection on a dialog display.

A data conversion unit 207 of the native layer 202 converts data in the native layer 202 into a data format usable in the script layer 201. In contrast, the data conversion unit 207 converts data sent from the script layer 201 into a data format usable in the native layer 202. A data conversion unit 208 of the script layer 201 converts data in the script layer 201 into a data format usable in the native layer 202. To the contrary, the data conversion unit 208 converts data sent from the native layer 202 into a data format usable in the script layer 201. In this embodiment, for example, image data obtained by the image loading unit 205 of the native layer 202 is converted into the base64 data format usable in the script layer 201, and the converted data is transferred to the script layer 201.

Loading/Saving of Image Data

A data holding unit 209 of the native layer 202 holds image data loaded by the image loading unit 205 and image data having undergone image processing by an image processing unit 210. The held image data is rasterized into RGB image data. Image processing can therefore be immediately executed on the image data which has been loaded by the image loading unit 205 and held. A data saving unit 216 of the native layer 202 stores, in the image set 206, image data held in the data holding unit 209, as needed. The data saving unit 216 is sometimes used to save stamp images prepared by the application, and temporary files.

Output

A rendering unit 219 of the script layer 201 is a block for creating a script about rendering of an output (display/print) target image. The rendering unit 219 includes a content drawing unit 211, a content operating unit 212, and an image processing control unit 213. In this embodiment, the display 106 does not display an image during script creation by the rendering unit 219. The content drawing unit 211 describes print target content in a Web standard language. The content operating unit 212 of the script layer 201 reflects an operation to an image in the script. Examples of the operation to an image are enlargement, movement, and rotation of an image. The description by the content drawing unit 211 also reflects content operated by the content operating unit 212. The script of the described content is interpreted by an interpreter 218 of the OS layer 203 to be described later, and displayed on the display 106. The image processing control unit 213 decides a correction parameter (for example, a luminance correction value) used in image processing, and a correction target image. If necessary, the data conversion unit 208 of the script layer 201 converts these data into a data format usable in the native layer 202, and transfers the converted data to the native layer 202.

The image processing unit 210 of the native layer 202 executes image processing (for example, luminance correction) on image data designated by the image processing control unit 213 of the script layer 201. At this time, image processing to be executed is decided in accordance with a correction parameter set by the image processing control unit 213. As for designation of image data, for example, there is a method of receiving the path of image data from the script layer 201.

A touch event unit 220 of the OS layer 203 obtains information about a touch on the display 106 by the user. The information about a touch includes, for example, detection of a touch on the display, and touched position information. The obtained data is transmitted to the content operating unit 212 of the script layer 201 via the native layer 202. For example, information about selection of a desired stamp image on the display 106 by the user is transmitted by the touch event unit 220 to the content operating unit 212 of the script layer 201 via the native layer 202.

The interpreter 218 of the OS layer 203 is a block which interprets/executes a script instruction generated in the script layer 201 and described in the Web standard language. An image drawing instruction or the like is interpreted by the interpreter 218, and display on the display 106 is executed. The interpreter 218 translates print content drawn in the script layer 201, renders the image data at a print resolution, and outputs the image data as RGB pixel values. The interpreter 218 is constituted in the OS layer 203 in FIG. 2, but may be constituted in the native layer 202.

Communication with Printer

A printer control unit 214 of the script layer 201 controls a rendering start request, a printer detection request, display of a printer setting screen, and generation and transmission of print information. Here, rendering is creation of bitmap data necessary for printing. In the printer setting screen, settings such as a paper size, paper type, and color/monochrome printing are possible. A printer data generation unit 215 of the native layer 202 generates print information based on the items set in the printer setting screen.

Based on the request from the printer control unit 214 of the script layer 201, the printer data generation unit 215 of the native layer 202 generates a command and data necessary for printer communication. The data necessary for printer communication is data complying with a communication protocol, and the command is data for deciding the operation of the printer such as printing or scanning. A printer communication unit 217 of the OS layer 203 is an interface for transmitting data received from the printer data generation unit 215 to the connected printer 115.

[Overall Sequence]

Figure 3:
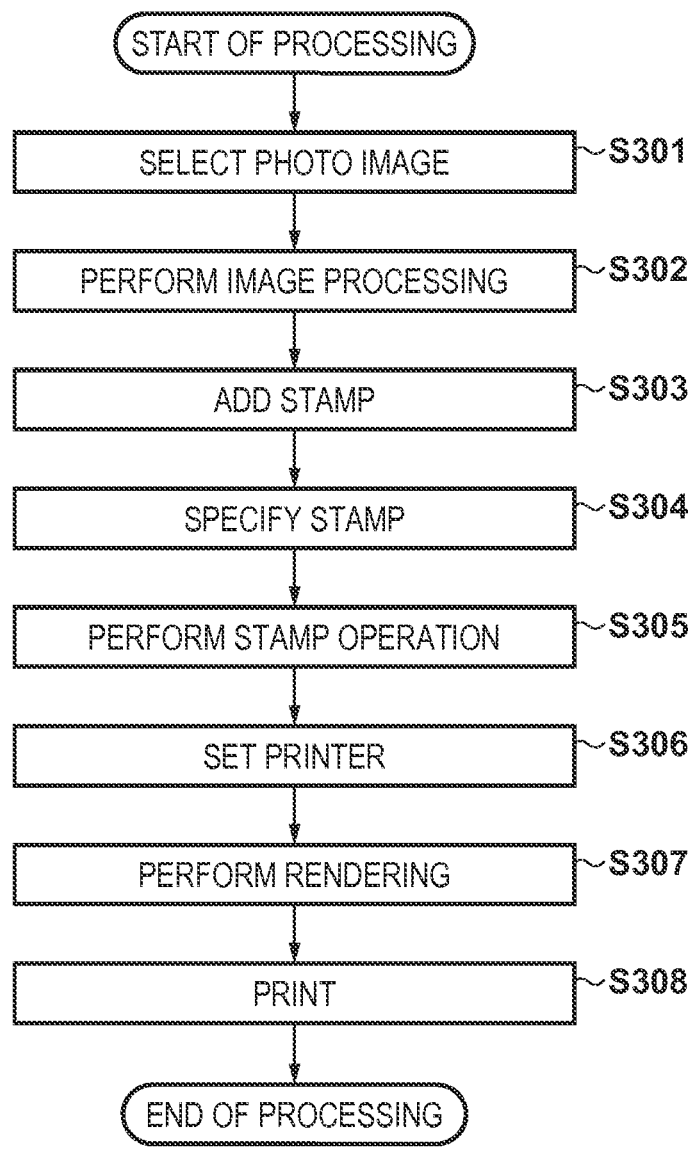
FIG. 3 is a flowchart showing the procedures of overall photo print processing.
Figure 12:
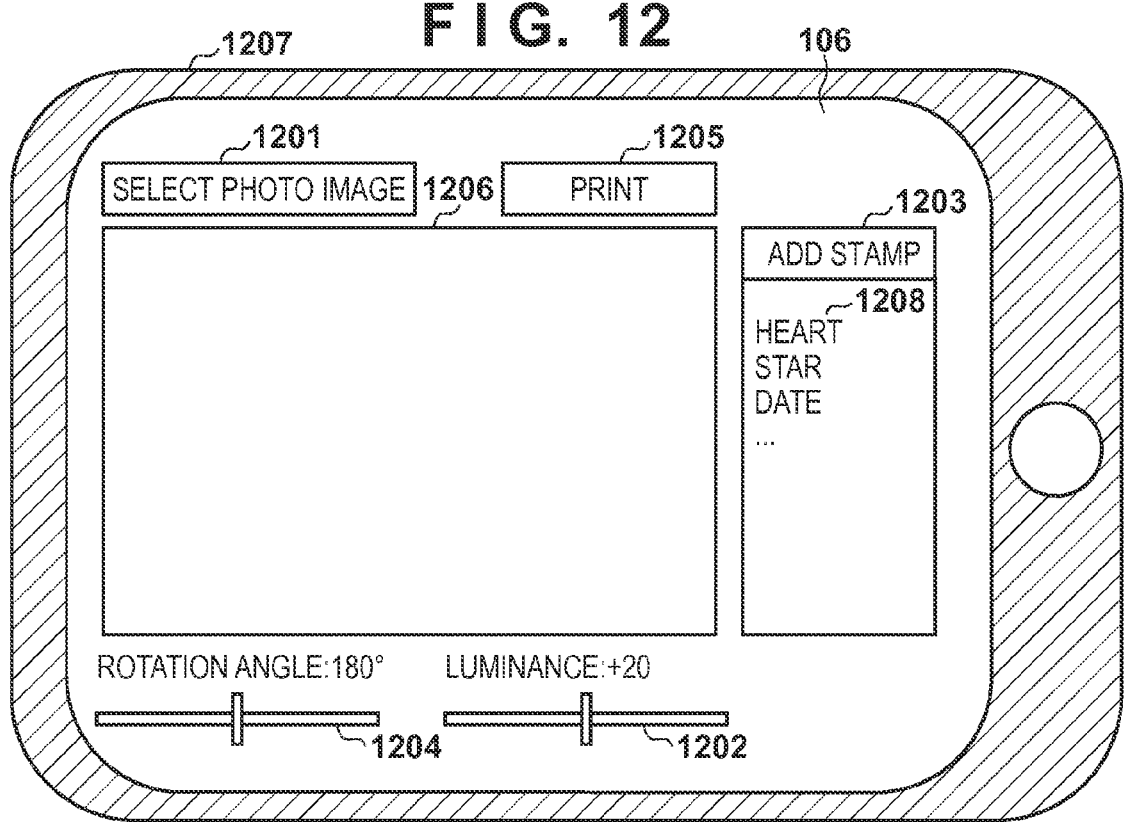
FIG. 12 is a view showing an example of a photo print application screen.

FIG. 3 is a flowchart showing the procedures of overall photo print processing according to this embodiment. The processing in FIG. 3 is implemented by, for example, reading out a program from the ROM 102 to the RAM 103 and executing it by the CPU 101. FIG. 12 is a view showing an example of a photo print application screen described by a script according to this embodiment.

In step S301, the CPU 101 detects pressing (including even a touch operation: this also applies to the following description) of a photo image selection button 1201 by the user, and accepts selection of an image. Upon accepting the selection of the image, the CPU 101 displays the selected image in an entire drawing area 1206.

In step S302, the CPU 101 detects a correction parameter (for example, a luminance correction value) which has been set by the user using a slide bar 1202 and is used at the time of image processing. The CPU 101 executes image processing on the image in accordance with the detected correction parameter, and displays the image in the entire drawing area 1206.

In step S303, if the CPU 101 detects pressing of a stamp addition button 1203 by the user, it displays a list of stamp images. The CPU 101 accepts selection of a desired stamp image by the user, and adds and displays the stamp image in the drawing area 1206.

In step S304, the CPU 101 detects a stamp image specifying operation by the user. Specifying of a stamp image is processing of determining a touch of a stamp image based on a coordinate point touched on the display 106 and the coordinate point of the stamp image. When the stamp image is specified, it changes to the operation acceptance state. The operation acceptance state is a state in which when an instruction about a stamp image operation (for example, swipe) is issued, the stamp image can be operated (can be swiped) in accordance with this instruction. When there is no stamp image in the operation acceptance state, nothing occurs even if an instruction about a stamp image operation is issued.

In step S305, the CPU 101 accepts a stamp image operation by the user. For example, when the user operates a slide bar 1204 in FIG. 12, the CPU 101 rotates the stamp image in the operation acceptance state in accordance with this operation.

Figure 13:
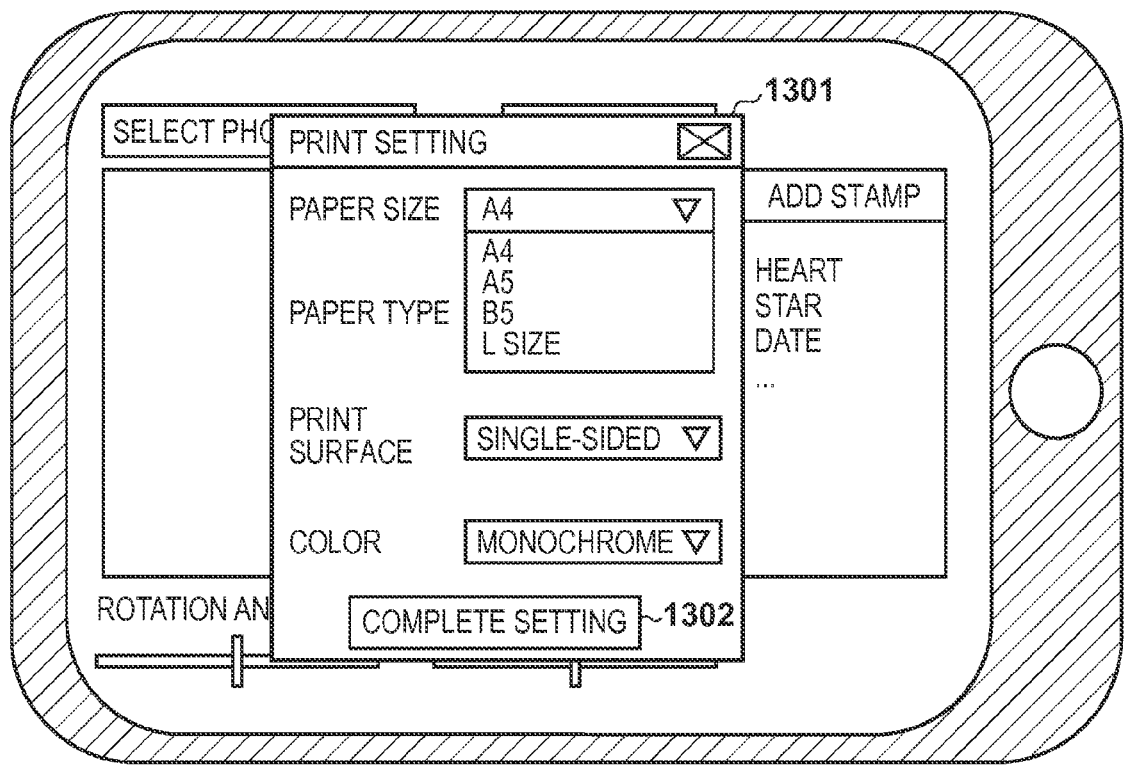
FIG. 13 is a view showing an example of the setting UI of a printer.

In step S306, if the CPU 101 detects pressing of a print button 1205 by the user, it displays a setting UI of information necessary for printing on the display 106. The information necessary for printing includes, for example, a paper size, double-sided, and monochrome/color printing. FIG. 13 shows an example of the setting UI of the printer.

In step S307, if the CPU 101 detects pressing of a setting completion button 1302 by the user, it starts rendering to create bitmap data necessary for printing. The CPU 101 creates image data at a print resolution for the image displayed in the drawing area 1206.

In step S308, the CPU 101 transmits the image data created at the print resolution in step S305 to the printer 115 together with a printer control command, and controls the printer 115 to output a printed product.

Although a minimum sequence has been described above for descriptive convenience, the present invention is not limited to the above-described processing sequence. A detailed operation in each step will be explained below.

[Printer Selection]

First, when the user activates an application, the application performs discovery processing (not shown) of a connectable printer. The discovery processing indicates processing of specifying the IP address of a connectable printer in a LAN in which the portable information terminal 100 exists. The portable information terminal 100 transmits a request command to the IP address (in some cases, a plurality of IP addresses) obtained by the discovery processing to obtain attribute information (printer information) of the printer 115, and obtains a reply from the printer 115. More specifically, a command for obtaining information of each printer is generated in the native layer 202. The command is an instruction to designate the operation of the printer 115, and expressed in XML given by:

```
<?xml version="1.0" encoding="utf-8" ?>
<cmd xmlns:trans="http://www.trans/example/">
   <contents>
      <operation>GetInformation</operation>
   </contents>
</cmd>
```

The generated command is broadcast to, for example, routers connected by Wi-Fi® in a format complying with the communication protocol of the printer 115. As the communication method, Wi-Fi Direct or a telephone line can be used. In this embodiment, the detection of the printer 115 is not limited to wireless LAN router connection.

As a result of transmitting the command, the native layer 202 receives a response from the printer 115 via the printer communication unit 217 of the OS layer 203. In the following example, a printer name is obtained by a PrinterName tag:

```
<?xml version="1.0" encoding="utf-8" ?>
<cmd xmlns:trans="http://www.trans/example/">
   <contents>
      <PrinterName>PrinterA</PrinterName>
      <ImageProcGrp>A</ImageProcGrp>
      <ResolutionX>400</ResolutionX>
      <ResolutionY>400</ResolutionY>
   </contents>
</cmd>
```

In addition, an image processing group usable by each printer can be obtained by an ImageProcGrp tag. ResolutionX and ResolutionY are image resolutions needed by the engine of the printer. The unit is, for example, dpi.

A model name obtained in the native layer 202 can be transmitted to the script layer 201 and displayed in a list of printers by a virtual code given by:

```
<form name="frmPrinter">
   <select name="selPrinter">
   </select>
</form>
<script type="text/javascript">
   Function fAddPrinter(PrinterName, count){
      var
   sObj=document.forms["frmPrinter"].elements["selPrinter"]
   ];
      for (var i=0; i<count; i++){
         var idx=sObj.length;
         sObj.options[idx]=new Option(PrinterName[i]);
      }
   }
</script>
```

The select tag is a description for displaying the list. The JavaScript code described in the script tag allows addition of obtained printer names (which are stored as the PrinterName array) to the list.

Figure 14:
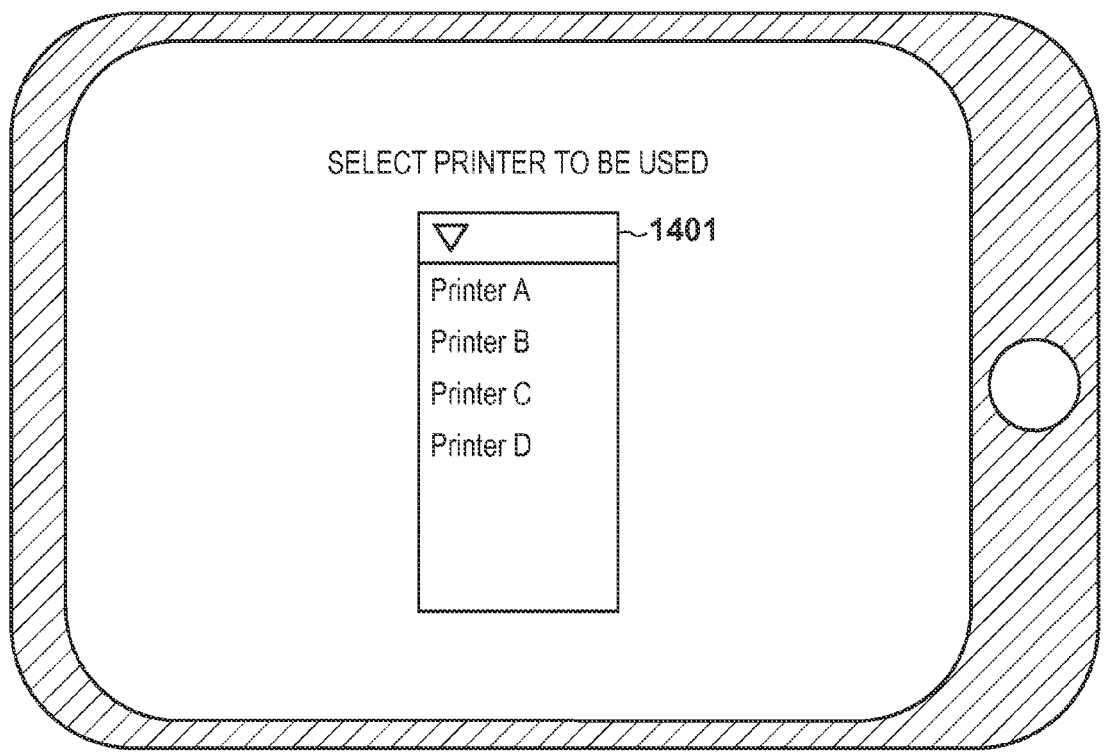
FIG. 14 is a view showing an example of a list of printers.

FIG. 14 is a view showing a list 1401 of printers displayed on the screen when the interpreter interprets the above-described virtual code generated in the script layer 201. When the user selects an intended printer from the list 1401, the script layer 201 obtains an ID indicating the ordinal number of the list, and transfers it to the native layer 202. After selecting the printer, the processing shifts to photo selection processing.

[Photo Image Selection]

Figure 4:
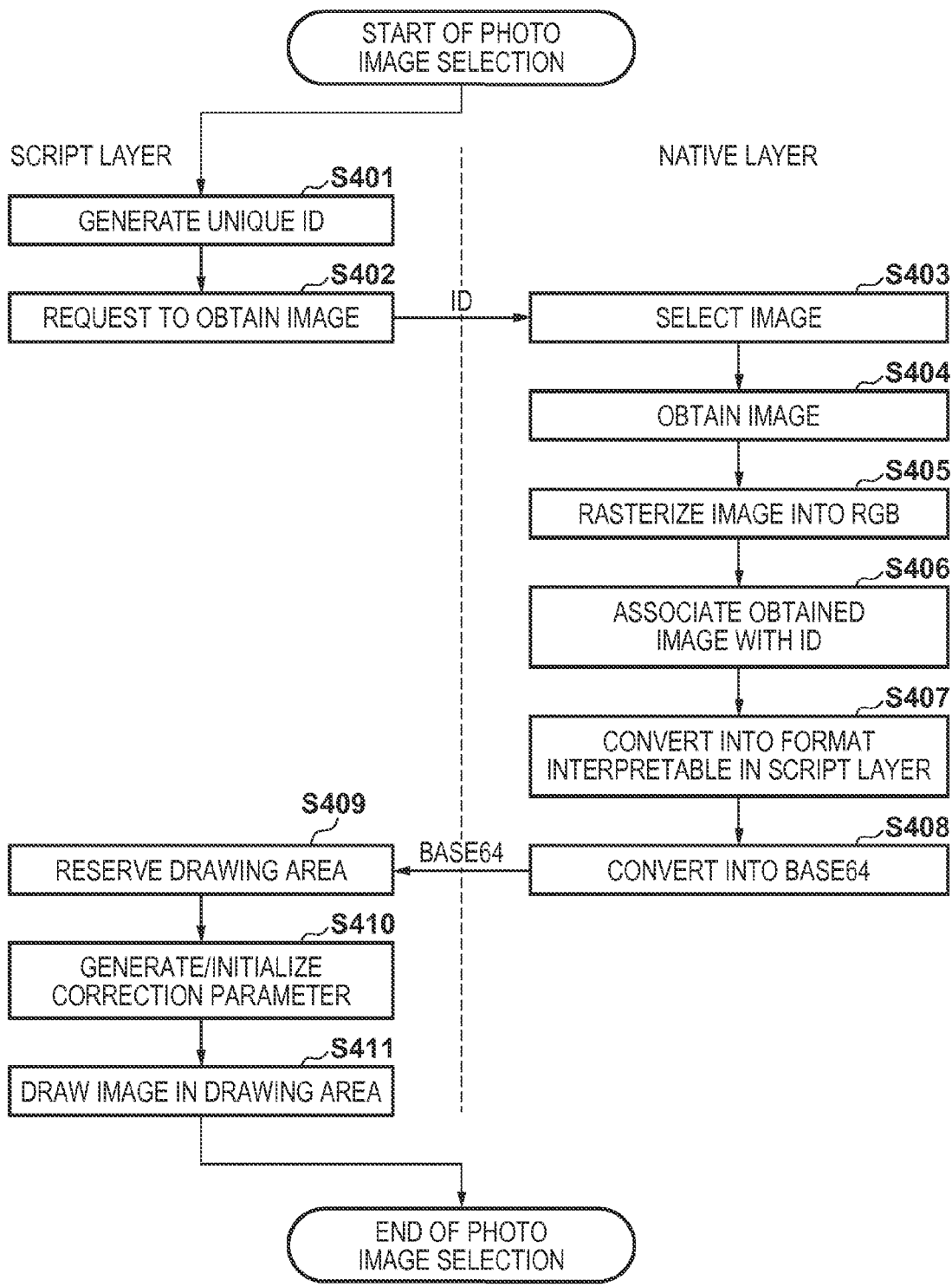
FIG. 4 is a flowchart showing photo image selection processing in step S301.

As described above, when pressing of the photo image selection button 1201 by the user is detected, the processing in step S301 starts. FIG. 4 is a flowchart showing the photo image selection processing in step S301. Steps S401, S402, and S409 to S411 in FIG. 4 are processes to be executed by the script layer 201, and steps S403 to S408 are processes to be executed by the native layer 202. The same illustration applies to other flowcharts.

In step S401, the image obtaining unit 204 of the script layer 201 generates a unique ID for identifying image data to be obtained. The ID may take any form such as a numerical value or a character string as long as it can be transmitted from the script layer 201 to the native layer 202.

In step S402, the image obtaining unit 204 of the script layer 201 transfers the ID to the native layer 202, and requests image selection. As the request method, the script layer 201 may directly invoke an image selection API unique to the native layer 202. When the image selection API unique to the native layer 202 cannot be directly invoked, a wrapper may be prepared in the native layer 202. The wrapper is a method of preparing in advance in the native layer 202 a function which can be invoked from the script layer 201, and invoking the function unique to the native layer 202 within the native function. The image selection API has a mechanism of transferring an ID as, for example, an argument. With this arrangement, the script layer 201 can transfer the ID to the native layer 202.

In step S403, the native layer 202 performs display control to display a device-specific image selection UI on the display 106. The image loading unit 205 accepts selection of an image on the displayed image selection UI by the user. The selection of an image may be selection of an image in a removable storage medium or selection of image data captured using the camera function of the portable information terminal 100.

In step S404, the image loading unit 205 of the native layer 202 obtains image data corresponding to the selected image from the image set 206. The image data is obtained by, for example, downloading or copying an image file. The file is opened in accordance with a language used in the native layer 202.

In step S405, the data holding unit 209 of the native layer 202 rasterizes the obtained image data into RGB data. The image data is held as RGB data in this embodiment, but is not limited to this. For example, bitmap data may be held in, for example, a JPEG (Joint Photography Expert Group), PNG (Portable Network Graphics), or RGBA format. The RGBA format is a data format obtained by combining A representing transparency with R, G, and B (Red, Green, and Blue) of image data.

In step S406, the data holding unit 209 of the native layer 202 stores the rasterized RGB data in association with the ID received in step S403. As the association method, for example, an object having the ID and RGB data is created to make it possible to specify the RGB data by the ID. The association between the ID and the RGB data is not limited to pairing the ID and the RGB data. For example, a method of associating the ID and the path of the RGB data may be used. Alternatively, a method of associating the first address of RGB data, or associating a function of invoking RGB data may be used.

In step S407, image data convertible into a format supported by the script layer 201 is generated based on the RGB data obtained in step S405. In this embodiment, for example, image data in the JPEG format is generated. The conversion from RGB data into JPEG data uses an encoder included in the OS.

In step S408, the data conversion unit 207 of the native layer 202 converts the JPEG data into base64 data. This is because neither the RGB data array nor the JPEG binary data can be used intact in the script layer 201, and the data needs to be converted into a format usable in the script layer 201. This embodiment assumes that, when JavaScript® is used, image data handled in the script layer 201 has the base64 format. base64 is an encoding method for handling binary data as character string data.

In step S409, the data conversion unit 208 of the script layer 201 receives the base64 data converted in step S408 from the data conversion unit 207 of the native layer 202. Then, an area for displaying the base64 data is reserved in the RAM 103. In this embodiment, for example, the canvas function of the HTML is used to reserve the memory, and the API of the Context object of the canvas is used to draw an image.

In this embodiment, the script layer 201 requests the native layer 202 to obtain image data, and uses the image data obtained by the native layer 202 for UI display, as described above. With this arrangement, even when image data is obtained by the canvas, a display based on the image data can be provided at the time of executing the application.

In step S410, the image processing control unit 213 of the script layer 201 generates and initializes a correction parameter. The correction parameter is an object holding parameters that decide the content of image processing in step S302. Image processing to be executed in the native layer 202 is decided in accordance with the correction parameter. For example, the following correction parameter is generated by JavaScript:

```
var CorrectionParam = function( ){
    this.brightness = 10;
}
```

This correction parameter represents that a variable name "brightness" for brightness correction is stored in a CorrectionParam object and a value of 10 is stored in brightness. For descriptive convenience, the correction parameter is only for brightness correction. However, types of image processing can be added by adding parameters for other correction processes.

In step S411, the image processing control unit 213 of the script layer 201 designates base64 data received from the native layer 202 as data to be drawn in the drawing area 1206. The interpreter 218 of the OS layer 203 can therefore interpret the script to display the image in the drawing area 1206. An example of a code for reflecting the base64 data in the drawing area 1206 is:

```
var base64Data = base64 data from the native
var canvas = document.createElement("canvas");//reserve
the drawing area of an image
canvas.setAttribute("width", 100);//set the size of the
drawing area
canvas.setAttribute("height", 100);
canvas.setAttribute("id", "ImageID");//add an ID to the
canvas
var context = canvas.getContext("2d");//generate an
object which is drawn in the drawing area and has an
API
var img = new Image( );//generate an Image object
img.src = base64Data;//set the URI of the image as the
received base64 data
img.onload = function( ){//start processing after the
end of loading the image
    context.drawImage(img, 0, 0, img.width,
img.height, 0, 0, canvas.width, canvas.height);//draw
the image in the drawing area using the method of a
context object
    document.getElementById("div").appendChild(canvas
);}
```

This embodiment uses a layered structure of canvases. When an operation such as drawing, movement, or enlargement is specified, these canvases are sequentially added to the drawing area 1206 designated by div. Normally, each canvas is handled as one image, and when a stamp image or the like is added after drawing a photo image on the canvas, the photo image and the stamp image are combined into one image. To the contrary, since canvases are superimposed and displayed using the layered structure in this embodiment, they are displayed as one image to the user, but actual drawing products are independent of each other. An example is a form in which a plurality of canvas objects exist in the div area, as in HTML DOM (Document Object Model). This example is:

```
<div width = 100 height = 100>
<canvas id="ImageID" width=100 height=100
style="position:absolute;left:0px; top:0px;"></canvas>
<canvas id="Stamp" width=10 height=10
style="position:absolute;left:10px;
top:10px;"></canvas>
...
</div>
```

The first canvas having a longitudinal width of 100 and a lateral width of 100 is added to a div area having a longitudinal width of 100 and a lateral width of 100. That is, the canvas overlaps the entire display area, and the entire photo image is displayed. The second canvas having a longitudinal width of 10 and a lateral width of 10 is added to a coordinate point (10, 10) when the upper left vertex of the div area is set as a reference. The respective canvases are independent, and unique IDs are designated for the respective canvases. When performing an operation by the script or obtaining information of a specific canvas, a corresponding ID is used. For example, the longitudinal width of the second canvas can be obtained by the following operation:
var width=document.getElementById("Stamp").width;

[Image Processing]

Figure 5:
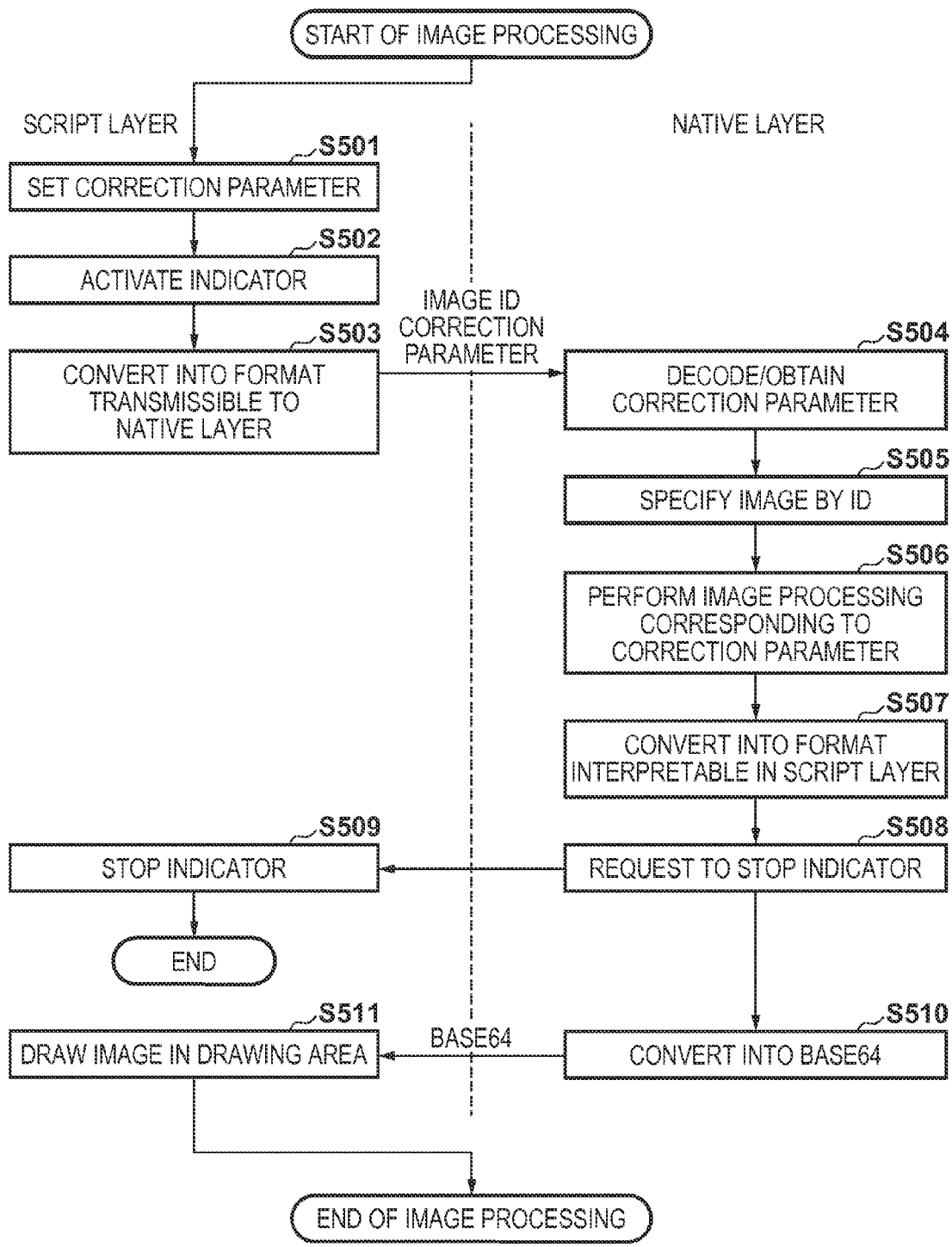
FIG. 5 is a flowchart showing image processing in step S302.

When setting of the slide bar 1202 by the user is detected, the processing in step S302 of FIG. 3 starts. FIG. 5 is a flowchart showing the image processing in step S302.

In step S501, the image processing control unit 213 of the script layer 201 updates the value (for example, brightness: this also applies to the following description) of the correction parameter generated in step S410 into a value set by the slide bar 1202.

In step S502, the image processing control unit 213 of the script layer 201 performs processing of activating an indicator, and displaying it on the display 106. The indicator is an icon which is displayed on the display 106 during data processing and represents a working state.

In step S503, the data conversion unit 208 of the script layer 201 converts the correction parameter into a JSON character string usable in the native. This is because the correction parameter has the object format, as described above, and cannot be interpreted by the native layer 202. The converted JSON character string is transferred to the native layer 202 together with the ID for identifying the image data generated in step S401.

In step S504, the image processing unit 210 of the native layer 202 parses (analyzes) the JSON data received as the character string. Parsing uses a parser included in the OS. The image processing unit 210 of the native layer 202 obtains the brightness value in the correction parameter by parsing.

In step S505, the image processing unit 210 of the native layer 202 specifies the image data (RGB data) rasterized into RGB data in step S405 based on the ID transmitted from the script layer 201. As described above, the association between the ID and the image data is not limited to pairing the ID and the image data, as described above. For example, the association may be performed by a method of associating the ID and the path of the image data. Alternatively, the association may be performed by a method of associating the ID and the first address of the image data, or a method of associating the ID and a function of invoking image data.

In step S506, the image processing unit 210 of the native layer 202 decides image processing to be executed based on the obtained correction parameter, and performs the image processing corresponding to the correction parameter on the image data specified in step S505. This embodiment assumes that "10" is added to the RGB values of all pixels in accordance with the luminance correction parameter.

Figure 15:
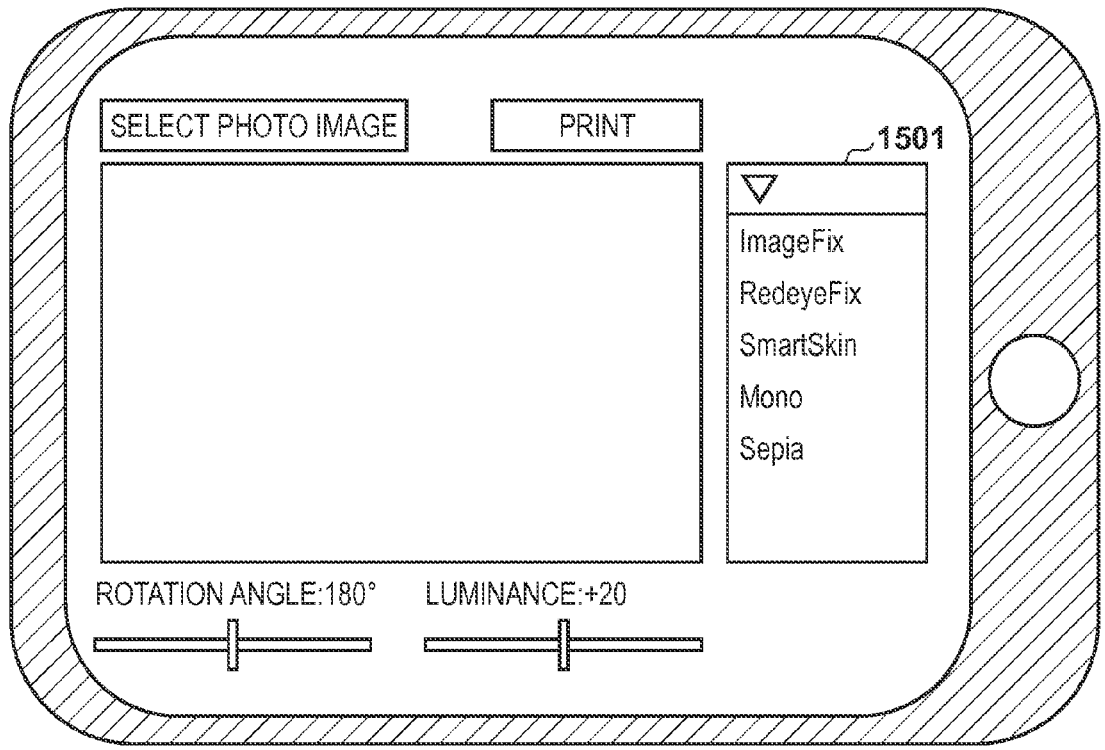
FIG. 15 is a view showing an example of a pull-down menu which displays a plurality of image processes.

Types of image processing may be added by adding other kinds of information to the correction parameter. For example, image processes such as known monochrome conversion, known sepia conversion, ImageFix, RedeyeFix, and SmartSkin may be added. ImageFix is processing of automatically analyzing a photo image by using human face detection or scene analysis, and performing appropriate brightness or white balance adjustment. RedeyeFix is processing of automatically detecting a red eye image from an image and correcting it. SmartSkin is processing of detecting a human face from a photo image, and preferably processing the skin region of the face. Image processing may be executed by a function provided by the OS layer 203. It is also possible to display a plurality of image processes executable from the obtained correction parameter in a pull-down menu 1501, and accept a user selection, as shown in FIG. 15.

In step S507, image data convertible into a format supported by the script is generated based on image data having undergone the image processing in step S506. In this embodiment, for example, JPEG image data is generated.

In step S508, the image processing unit 210 of the native layer 202 requests the script layer 201 to stop the indicator. This is performed by invoking an indicator stop function defined in the script layer 201 from the native layer 202.

In step S509, the image processing control unit 213 of the script layer 201 stops the indicator, and stops display on the display. In step S510, the data conversion unit 207 of the native layer 202 converts the JPEG data into base64 data, and transmits the base64 data to the script layer 201.

In step S511, the data conversion unit 208 of the script layer 201 receives the base64 data converted in step S508 from the native layer 202. Then, the image processing control unit 213 of the script layer 201 designates the base64 data received from the native layer 202 as data to be drawn in the drawing area 1206. Accordingly, the interpreter 218 of the OS layer 203 interprets the script, and the image having undergone the image processing is displayed in the drawing area 1206.

Although this embodiment has described that image processing starts in response to a change of the slide bar 1202, the present invention is not limited to this form. Another example is a form in which plus and minus buttons are arranged on the screen and the brightness is adjusted every time the user presses the buttons. Still another example is a form in which image processing is synchronized with a touch event by the user such that the brightness is increased when right half of an image is touched or decreased when its left half is touched. A form is also possible, in which only the correction parameter is changed by a user operation, and all image processes are performed at once upon accepting an image processing execution instruction.

The decision of image processing in step S506 may be performed by invoking a system function normally provided in the OS layer 219 from JavaScript by the binding function, and obtaining a clock rate Clk [MHz] of the CPU 101 from the system function. For example, an image processing group is specified based on the clock rate Clk using a predetermined threshold Th1. A virtual code to specify the group is given by: If (Clk>Th1) ImageProcGrp="A"; Else ImageProcGrp="B"

Note that this processing is normally done in the script layer 201 when the application is activated. If the image processing group is specified, a usable image processing display script is created in the script layer 201 by a code:

```
<form name="frmIProc">
    <select name="selIProc">
    </select>
</form>
<script type="text/javascript">
    Function fAddImageProc(Grp){
        var
sObj=document.forms["frmIProc"].elements["selIProc"];
        if(Grp="A"){
            var idx=sObj.length;
            sObj.options[idx]=new Option("ImageFix");
```

-continued

```
    var idx=sObj.length;
    sObj.options[idx]=new Option("RedEyeFix");
    var idx=sObj.length;
    sObj.options[idx]=new Option("SmartSkin");
    var idx=sObj.length;
    sObj.options[idx]=new Option("Mono");
    var idx=sObj.length;
    sObj.options[idx]=new Option("Sepia");
  }
  Else if (Grp="B"){
    var idx=sObj.length;
    sObj.options[idx]=new Option("Mono");
    var idx=sObj.length;
    sObj.options[idx]=new Option("Sepia");
  }
}
</script>
```

In this script, if it is determined that the clock rate of the CPU 101 is larger than a give threshold, and complex image processing is executable (Grp=A), more image processing functions can be selected. On the other hand, if the clock rate of the CPU 101 is equal to or smaller than the given threshold, only processing such as monochrome conversion or sepia conversion of a light processing load can be selected. This script is translated by the interpreter 218 of the OS layer 203 and displayed on the screen. FIG. 15 is a view showing the state of drawing.

When the user selects an intended image processing function, the selected image processing ID can be discriminated using an HTML function. This image processing ID is transmitted to the image processing unit 210 of the native layer 202, and image processing corresponding to the selected function is applied.

[Stamp Image Addition]

Figure 6:
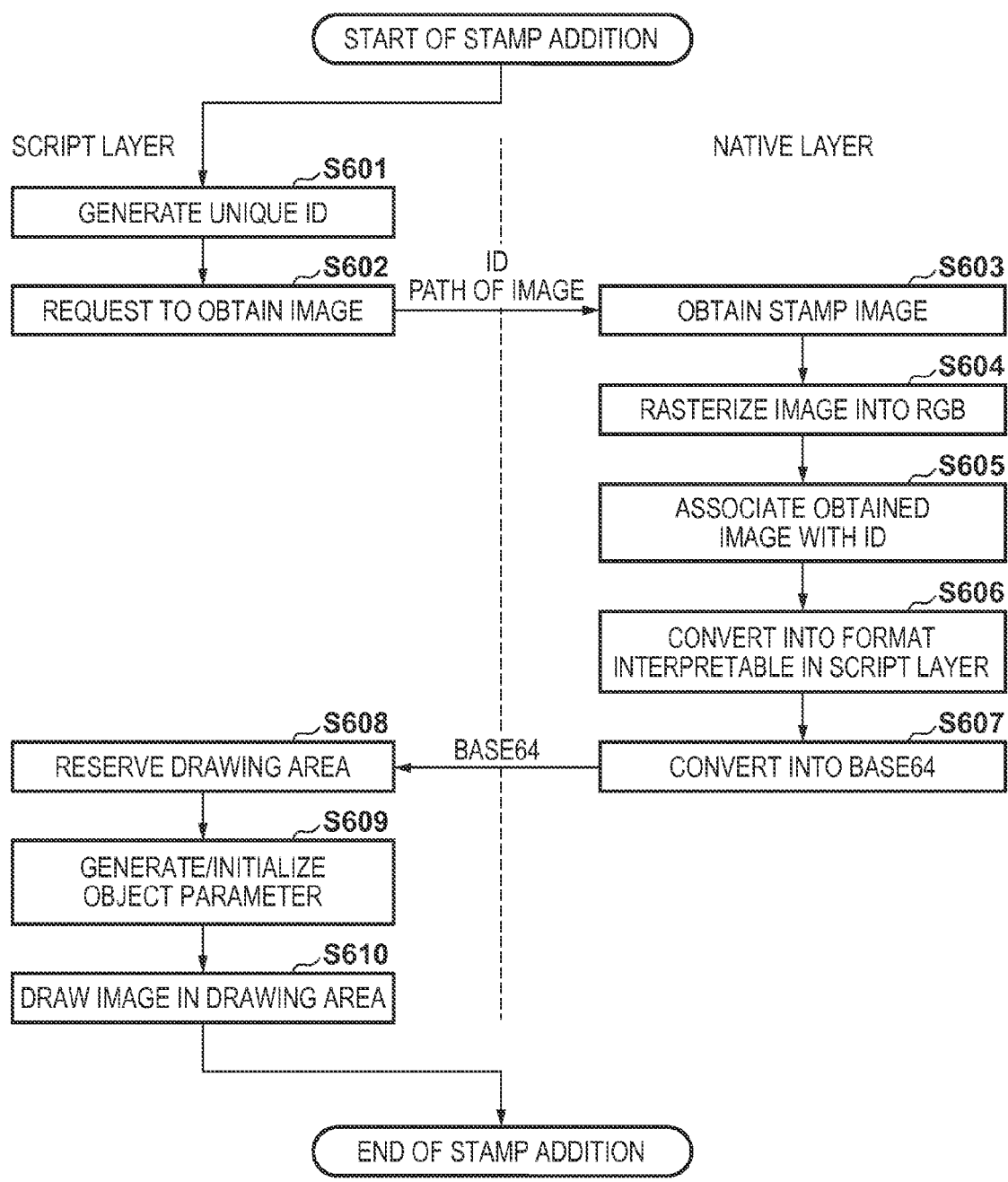
FIG. 6 is a flowchart showing stamp image addition processing in step S303.

When pressing of the stamp addition button 1203 by the user is detected and selection of a heart stamp image 1208 is detected, the processing in step S303 starts. FIG. 6 is a flowchart showing the stamp image addition processing in step S303.

In step S601, the image obtaining unit 204 of the script layer 201 generates a unique ID for identifying a stamp. This ID can take any form such as a numerical value or a character string as long as it can be transmitted from the script layer 201 to the native layer 202.

In step S602, the image obtaining unit 204 of the script layer 201 transmits the ID generated in step S601 and the absolute path of an image to be used as a stamp image to the native layer 202, and requests obtainment of the image.

In step S603, the image loading unit 205 of the native layer 202 obtains the image data by a device-specific API based on the absolute path of the image received from the script layer 201.

In step S604, the data holding unit 209 of the native layer 202 rasterizes the obtained image data into RGB image data and holds it.

In step S605, the data holding unit 209 of the native layer 202 stores the rasterized RGB image data and the ID received in step S602 in association with each other, as in step S406.

In step S606, image data convertible into a format supported by the script is generated based on the RGB data obtained in step S604. In this embodiment, for example, JPEG image data is generated. The conversion from RGB data into JPEG data uses an encoder included in the OS.

In step S607, the data conversion unit 207 of the native layer 202 converts the JPEG data into base64 data, and transmits the base64 data to the script layer 201.

In step S608, the data conversion unit 208 of the script layer 201 receives the base64 data converted in step S607 from the native layer 202. An area for displaying the base64 data is reserved in the RAM 103. For example, the HTML canvas function is used to reserve the memory.

In step S609, the image processing control unit 213 of the script layer 201 generates and initializes an object parameter. The object parameter is an object for holding parameters to be used at the time of drawing. For example, the following object parameter is generated by JavaScript:

```
    var ObjectParam = function( ){
        this.posX = 10;
        this.posY = 10;
        this.width = 100;
        this.height = 100;
        this.ImageData = BASE64Data;
    }
```

This object parameter represents that a variable name "posX" indicating an x-coordinate from a reference point is included in an ObjectParam object, and a value of 10 is stored in posX. This reference point is the upper left coordinate point of the drawing area 1206. Similarly, posY represents a y-coordinate when the upper left corner of the drawing area 1206 is set as the reference point, width represents the lateral width of the drawing area of a stamp image, and height represents the longitudinal width of the drawing area. BASE64Data represents image data received from the native layer 202.

That is, the object parameter corresponds to a drawing product object in this embodiment. In this embodiment, the size, position, and image data of a drawing product are used as the object parameter for descriptive convenience. However, other parameters (for example, rotation angle, translation amount, and enlargement magnification) may be added and used at the time of drawing, rendering, or an object operation. Even the information holding method for the drawing object is not limited to this embodiment.

In step S610, the image processing control unit 213 of the script layer 201 designates the base64 data received from the native layer 202 as data to be drawn in the drawing area 1206. The interpreter 218 of the OS layer 203 interprets the script, and the image can be displayed in the drawing area 1206 based on the object parameter initialized in step S609.

Although one stamp image is handled in this embodiment for descriptive convenience, a plurality of stamp images may be handled. In addition, image data prepared in advance is used as a stamp image in this embodiment. However, a method of generating a drawing product by the script using the Context object of a canvas may be used. In this case, in step S602, a drawing product generated using the Context object is transmitted to the native layer 202, and the data holding unit 209 holds the drawing product as RGB data.

[Specifying of Stamp Image]

Upon detecting a tap operation on the display 106 by the user after adding a stamp image in step S303, the stamp image specifying processing in step S304 starts. The tap operation is a touch operation of pressing the display 106 by the finger of the user. This is equivalent to "click" in a PC.

Figure 7:
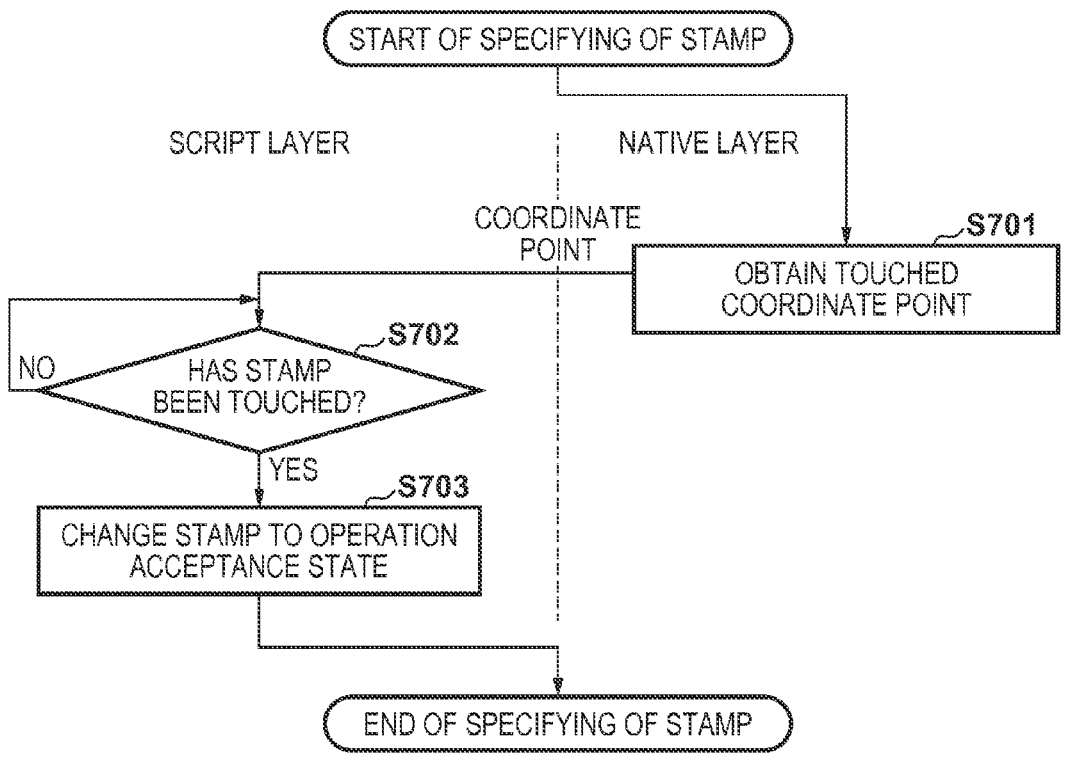
FIG. 7 is a flowchart showing stamp image specifying processing in step S304.

FIG. 7 is a flowchart showing the stamp image specifying processing.

In step S701, the image processing unit 210 of the native layer 202 obtains the coordinate point of the tap via the touch event unit 220 of the OS layer 203, and transmits it to the script layer 201.

In step S702, the content operating unit 212 of the script layer 201 determines, from the coordinate point sent from the native layer 202 and information of the object parameter generated in step S609, whether a stamp image has been touched. Since the object parameter of the stamp image remains unchanged from its initial value, the stamp image is drawn in a square area having upper left vertex coordinates of (10, 10) and lower right vertex coordinates of (110, 110). That is, if x- and y-coordinates sent in step S701 fall within the range of the square area, it is determined that the stamp image has been touched. For example, if a value obtained by subtracting the x-coordinate of the drawing area 1206 from the x-coordinate transmitted in step S701 falls within the range of 0 to 100, and a value obtained by subtracting the y-coordinate of the drawing area 1206 from the transmitted y-coordinate falls within the range of 0 to 100, it is determined that the stamp image has been touched. If there are a plurality of stamp images, the determination is made sequentially from a stamp image displayed in an upper layer, and when a stamp image is specified, the determination processing ends. If it is determined that the stamp image has been touched, the stamp image changes to a state in which an operation to the stamp image is accepted.

In step S703, the content operating unit 212 of the script layer 201 changes the stamp image to the operation acceptance state. The operation acceptance state is a state in which when an instruction about a stamp image operation (for example, swipe) is issued, the stamp image can be operated (can be swiped) in accordance with this instruction. When there is no stamp image in the operation acceptance state, nothing occurs even if an instruction about a stamp image operation is issued. The ID of the stamp image in the operation acceptance state is temporarily stored as the ID of a stamp image of interest in the script layer 201. Thus, the script layer 201 can uniquely specify the stamp image stored in the native layer 202.

[Stamp Image Operation]

Figure 8:
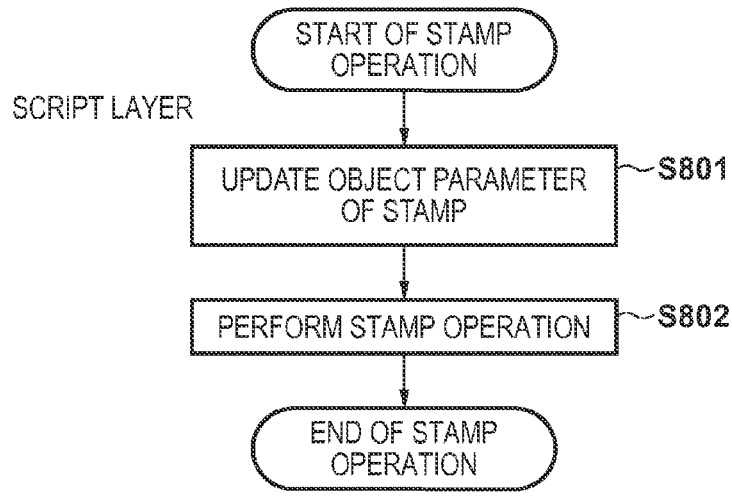
FIG. 8 is a flowchart showing stamp image operation processing in step S305.

When the operation of the slide bar 1204 by the user is detected, the processing in step S305 starts. FIG. 8 is a flowchart showing the stamp image operation processing in step S305.

In step S801, the content operating unit 212 of the script layer 201 updates the object parameter value (for example, rotate) of the stamp image into a value set by the slide bar 1204.

In step S802, the content operating unit 212 of the script layer 201 draws again, in the drawing area 1206 using the object parameter, the stamp image which has changed to the operation acceptance state in step S703. For example, when the stamp image is drawn using the HTML canvas, the image in the canvas can be rotated suing the rotate method of the Context object of the canvas.

Although the operation to the stamp image is rotation in the above description, it may be an operation such as enlargement/reduction or translation. If it is configured to add an object parameter to a photo image, the same operation as the operation to the stamp image becomes possible.

[Printer Setting]

Figure 9:
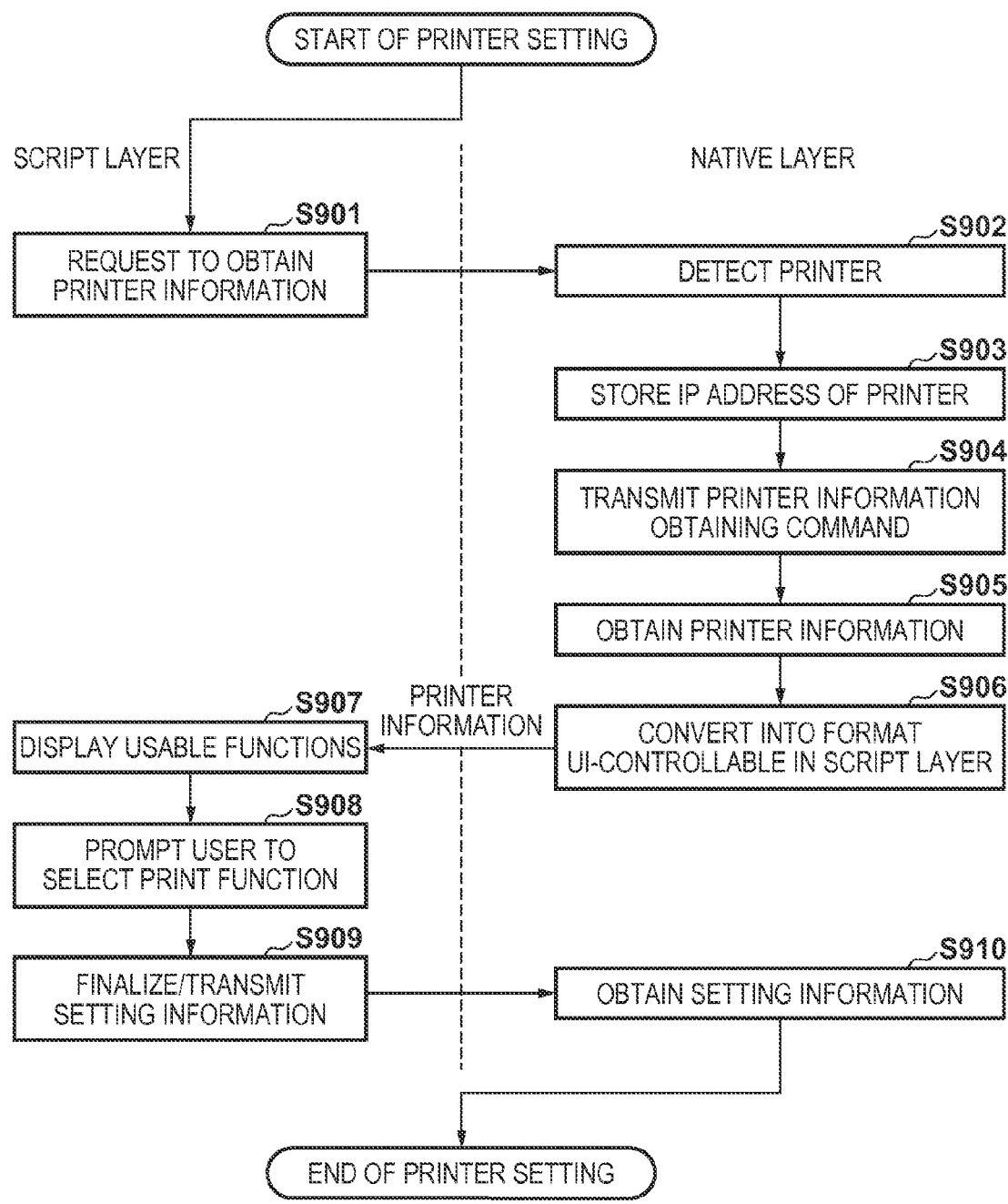
FIG. 9 is a flowchart showing printer setting processing in step S306.

When pressing of the print button 1205 by the user is detected, the processing in step S306 starts. FIG. 9 is a flowchart showing the printer setting processing in step S306.

In step S901, the printer control unit 214 of the script layer 201 requests the native layer 202 to obtain printer information. As the request method, for example, an API unique to the native layer 202 is invoked from the script layer 201 by using the binding function. In this case, a function which can be directly invoked from the script layer 201, or a so-called wrapper of indirectly invoking the function is prepared in advance in the native layer 202. For example, a GetPrinterInfo native function is prepared and invoked from the script layer 201.

In general, direct communication with an external device from the script layer 201 is impossible owing to the security restriction because, for example, it is difficult to guarantee confidential information. In this embodiment, the script layer 201 temporarily requests communication of the native layer 202, and then communicates with the external device via the native layer 202.

In step S902, if a corresponding function is invoked, the printer data generation unit 215 of the native layer 202 performs detection, that is, so-called discovery of the printer 115. To detect the communicable printer 115, a protocol such as Bonjour is used. The detection of the printer 115 is performed in, for example, a printer connected by the same wireless LAN router.

In step S903, the printer data generation unit 215 of the native layer 202 stores the IP address of the printer 115 that has responded by a method such as broadcasting or multicasting.

In step S904, the printer data generation unit 215 of the native layer 202 generates a command for requesting the IP address of the printer 115 that has responded in step S903, to provide printer information. If a plurality of printers have responded, the printer data generation unit 215 requests all the printers to provide information. The command is an instruction to designate the operation of the printer, and is expressed in, for example, XML (eXtensible Markup Language):

```
01: <?xml version="1.0" encoding="utf-8" ?>
02: <cmd xmlns:trans="http://www.xxxx/yyyyy/">
03:     <contents>
04:         <operation>GetPrinterInfo</operation>
05:     </contents>
06: </cmd>
```

A numerical value such as "01:" written on the left side of each line is a line number added for the descriptive purpose, and is not described in an original text in the XML format.

The first line indicates a header representing that the command is described in the XML format.

On the second line, cmd indicates the start of the command. A name space is designated by xmlns to designate the definition of interpretation of the command. Note that </cmd> on the sixth line indicates the end of the command.

The third line indicates a declaration of describing content thereafter, and the fifth line indicates the end of the content.

On the fourth line, an instruction to be requested is described. An actual instruction word exists between <operation> and </operation>. An instruction word "GetPrinterInfo" is an instruction to obtain information of the printer 115 serving as an external device. This instruction word describes, for example, content of requesting to provide printer information such as a paper type, a size, the presence/absence of a borderless print function, and the print quality supported by the printer 115.

Note that the command may be generated by loading a permanent text stored in advance in the ROM 102 or the like. Also, the command is not limited to a text format such as XML, and may be described in the binary format and communicated by a protocol complying with the format. The generated command is transmitted to the printer 115 via the printer communication unit 217 of the OS layer 203 in a format complying with a protocol supported by a transmission destination printer. The method of communication with the printer 115 is not limited to the above one. Connection using Wi-Fi Direct, Bluetooth, infrared communication, a telephone line, a wired LAN, or a USB is also usable.

Although a command is generated in the native layer 202 in the above description, it may be generated in the script layer 201. In this case, an instruction sentence in the XML format is created in the script layer 201 and transferred to the native layer 202. After that, the instruction sentence is transmitted to the IP address of the printer 115 in a format complying with a communication protocol in the above-described manner.

Upon receiving the command, the printer 115 transmits the printer information in the XML format complying with the communication protocol to the native layer 202. An example of the printer information is given by:

```
01: <?xml version="1.0" encoding="utf-8" ?>
02: <cmd xmlns:trans="http://www.xxxx/yyyyy/">
03:     <contents>
04:         <device id="Printer001" />
05:         <mode = 1>
06:             <media>GlossyPaper</media>
07:             <size>A4</size>
08:             <quality>1</quality>
09:             <border>no</border>
10:         </mode>
11:         <mode = 2>
            ...
            </mode>
            <mode = 3>
            ...
            </mode>
            ...
        </contents>
    </cmd>
```

The first line indicates a header representing that the information is described in the XML format.

On the second line, cmd indicates the start of the command. A name space is designated by xmlns to designate the definition of interpretation of the command. Note that </cmd> on the last line indicates the end of the command.

The third line indicates a declaration of describing content thereafter, and the content continues up to </contents>.

The fourth line indicates a device ID representing that the model name of the printer is "Printer001".

The fifth line and subsequent lines describe respective modes. Information of a corresponding mode is described between <mode> and </mode>. On the fifth line, the number of a mode is 1. After that, <media> describes the type of printing paper, <size> describes a paper size, <quality> describes the print quality, and <border> describes bordered/borderless information.

The 11th and subsequent lines describe information about mode 2 serving as another mode. In this way, the model name of a printer and all print modes supported by the printer are described in the XML format. Note that the method of describing printer information is not limited to this. The printer information may be described by a text, which is not a tag format, a binary format, or the like. Although information of the print function of the printer is transferred in the above example, the present invention is not limited to this. For example, information about image processing and analysis processing processable by the printer, the presence/absence of a silent print mode, the presence/absence of the use of a memory card, and a status such as the remaining ink amount may be transferred. Examples of image processing are color conversion (for example, monochrome conversion, sepia conversion, and chroma enhancement), multiple image layout, white balance correction, noise reduction, and processing of automatically correcting a photo to a preferable color and luminance.

In step S905, the printer data generation unit 215 of the native layer 202 receives the printer information from the printer 115 via the printer communication unit 217 of the OS layer 203. The printer data generation unit 215 obtains, from the received printer information, the items of the type and size of printing paper, print quality, and bordered/borderless in all the modes, and the number of items.

In step S906, the printer data generation unit 215 of the native layer 202 sends the printer information to the script layer 201 in a format interpretable by the script layer 201. For example, the printer data generation unit 215 of the native layer 202 sends the printer information in the XML format just as it has been received, or sends it after converting it into a tag-less text format. Every time a specific native function is invoked from the script layer 201, information may be transmitted as a return value. Alternatively, the argument of a mode to be obtained or the like may be given to the native function, and information may be transmitted as a return value. In addition, the information may be transferred using a JSON character string, or transferred by the data conversion units 207 and 208 using a character string such as base64.

In step S907, the script layer 201 forms a display screen based on the received printer information, and displays it on the display 106. If there are a plurality of connectable printers, the script layer 201 performs processing of displaying a plurality of printer names so that the user can select a printer. Note that selection of a printer is not limited to this. For example, the printer may be selected based on a printer which responds earliest, a printer having more functions, a printer with not so many print jobs, or the like.

In step S908, the script layer 201 performs processing of displaying, on the display 106, the print setting screen for prompting the user to select the type and size of printing paper, the print quality, bordered/borderless, and the like. An example of the method of forming a print setting screen is an HTML/JavaScript description:

```
<!DOCTYPE html>
<head>
<title>print setting </title>
<script>
    <!-- paper size -->
    var PaperSizeNum = GetPaperSizeNum( );
var p = document.getElementById("PaperList");
var i;
    for(i=0; i<PaperSizeNum; i++){
        p.options[i] = new Option(GetPaperSize(i), GetPaperSize(i));
}
    <!-- paper type -->
var MediaTypeNum = GetMediaTypeNum( );
    var m = document.getElementById("MediaList");
    var j;
    for(j=0; j<MediaTypeNum; j++){
m.options[i] = new Option(GetMediaType(j),GetMediaType(j));
}
    <!-- print quality -->
    var QualityNum = GetQualityNum( );
var q = document.getElementById("QualityList");
var k
    for(k=0; k< QualityNum; k++){
        q.options[i] = new Option(GetQuality(k),
```

-continued

```
    GetQuality(k));
}
    <!-- bordered/borderless -->
    var BorderNum = GetBorderNum( );
var b = document.getElementById("BorderList");
var l;
    for(l=0; l<BorderNum; l++){
b.options[i] = new Option(GetBorder(l),GetBorder(l));
}
    <!-- print function -->
    function printer( ) {
    SetPrint(document.getElementById("PaperList").value,
document.getElementById("MediaList").value,
document.getElementById("QualityList").value,
document.getElementById("BorderList ").value);
    }
</script>
</head>
<!-- display unit -->
<body>
paper size: <select id="PaperList"></select><br />
paper type: <select id="MediaList"></select><br />
print quality: <select id="QualityList"></select><br />
borderless: <select id="BorderList"></select><br />
<br />
<button id="btn1" onclick="printer( )">print setting
completion</button>
</body>
</html>
```

In the above description, GetPaperSizeNum( ) GetMediaTypeNum( ) GetQualityNum( ) and GetBorderNum( ) are native functions, and each native function has a function of obtaining an item count. For example, when paper sizes supported by the printer are four types of A4, A5, B5, and L size, GetPaperSizeNum( ) returns 4.

Also, GetPaperSize(n), GetMediaType(n), GetQuality(n), and GetBorder(n) are native functions, and each function returns the nth character string corresponding to the argument n. For example, the return value of GetPaperSize(0) as a function of returning the paper size is "A4", and the return value of GetPaperSize(1) is "A5". These values are obtained by the native layer 202 from information sent from the printer 115 via the OS layer 203.

Also, GetPaperSizeV(n), GetMediaTypeV(n), GetQualityV(n), and GetBorderV(n) are native functions, and each function returns the nth value corresponding to the argument n. For example, the return value of GetMediaTypeV(0) as a function of returning the text of a paper type is a word such as "glossy paper" which is displayed and presented to the user. To the contrary, the return value of GetMediaTypeV(0) is a word such as "GlossyPaper" which can be interpreted by the printer 115. The native layer 202 decides these words in association with the information sent from the printer 115. For example, if a value extracted from information sent from the printer 115 is "GlossyPaper", "glossy paper" is decided as a text to be displayed. As the decision method, the native layer 202 holds a correspondence table in advance and decides a text in accordance with the correspondence table.

In the above example, the paper size, paper type, print quality, and bordered/borderless settings are made. However, the present invention is not limited to this, and other settings such as double-sided/single-sided, color/monochrome, and ON/OFF of image correction may be made. Furthermore, not only the above-mentioned print function, but also information about image processing and analysis processing processable by the printer 115, the presence/absence of a silent print mode, the presence/absence of the use of a memory card, and a status such as the remaining ink amount may be displayed.

For example, a user interface such as a print setting screen 1301 shown in FIG. 13 is implemented using a Web rendering engine based on the obtained information as in the above example. That is, in this embodiment, the script layer 201 requests printer information of the external printer 115 via the native layer 202, and displays the print setting screen on the display 106 based on information obtained using the native function. Note that the HTML can be formed either in the script layer 201 or in the native layer 202. As shown in FIG. 13, the paper size and the like are provided by a pull-down menu, and a touch operation of selecting an item by the user can be accepted.

In step S909, upon detecting pressing of the setting completion button 1102, the printer control unit 214 of the script layer 201 transmits each print information selected by the user in step S708 to the native layer 202. In the above HTML example, SetPrint( ) invokes a native function by using the obtained printer setting information as an argument. In the above example, the paper size, paper type, print quality, and bordered/borderless settings are transferred as character strings to the native layer 202.

In step S910, the printer data generation unit 215 of the native layer 202 obtains the print information transmitted from the script layer 201. The printer data generation unit 215 generates a print command in accordance with the communication protocol of the printer based on the obtained print information, and transmits the print command to the printer 115 via the printer communication unit 217 of the OS layer 203.

[Rendering]

Figure 10:
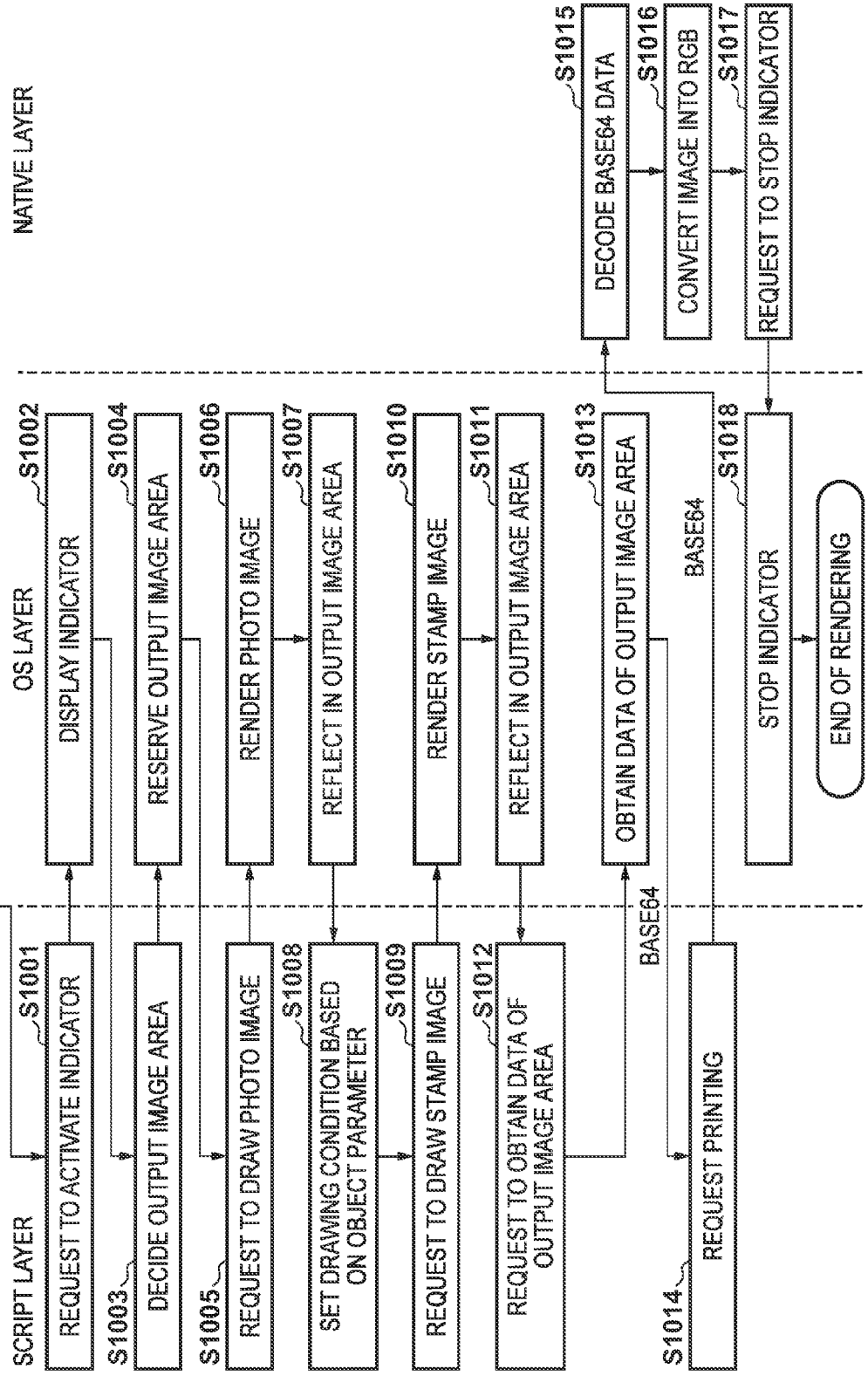
FIG. 10 is a flowchart showing rendering processing in step S307.

When pressing of the setting completion button 1302 of the print setting screen 1301 by the user is detected, the processing in step S307 starts. FIG. 10 is a flowchart showing the rendering processing in step S307.

In step S1001, the printer control unit 214 of the script layer 201 requests the OS layer 203 to activate an indicator. In step S1002, the OS layer 203 displays the indicator on the display 106.

In step S1003, the printer control unit 214 of the script layer 201 decides an output size corresponding to the paper size for printing based on the print information set in step S909, and transfers the output size to the OS layer 203.

In step S1004, the OS layer 203 reserves an output image area corresponding to the received output size in the RAM 103. The output image area is, for example, a canvas area.

In step S1005, the printer control unit 214 of the script layer 201 requests the OS layer 203 to draw a photo image. At this time, the printer control unit 214 requests the OS layer 203 to draw the photo image in the entire output image area reserved in step S1004. The drawing of the image is performed using the drawImage method of the Context object in the case of the canvas. The photo image data is represented by an object parameter ImageData.

In step S1006, the interpreter 218 of the OS layer 203 interprets the drawing-requested script, and renders the photo image. In step S1007, the OS layer 203 stores the image data after rendering in the output image area reserved in step S1004. Here, "reflect in output image area" in step S1007 of FIG. 10 is to add a change to the output image area (memory) reserved in step S1004, as described above, and is not to display an image on the display 106.

In step S1008, the image processing control unit 213 of the script layer 201 describes a change of the rendering condition based on the object parameter by the script for a stamp image. The change of the rendering condition is, for example, rotation or resizing of a stamp image.

In step S1009, the image processing control unit 213 of the script layer 201 sends a request to the OS layer 203 to draw the stamp image, together with the rendering condition set in step S1008.

In step S1010, the OS layer 203 renders the stamp image in accordance with the rendering condition set in step S1008. That is, in this embodiment, the OS layer 203 executes rotation or resizing of the stamp image.

In step S1011, the OS layer 203 stores the stamp image data after rendering in the output image area reserved in step S1004. Here, "reflect in output image area" in step S1011 of FIG. 10 is to add a change to the output image area (memory) reserved in step S1004, as in step S1007, and is not to display an image on the display 106.

In step S1012, the image processing control unit 213 of the script layer 201 requests the native layer 202 to obtain image data for printing.

In step S1013, the OS layer 203 converts the image data in the output image area into the base64 data format, and transmits the base64 data to the script layer 201.

In step S1014, the printer control unit 214 of the script layer 201 transmits the base64 data to the native layer 202, and requests printing.

In step S1015, the printer data generation unit 215 of the native layer 202 decodes the base64 data transmitted from the script layer 201. The printer data generation unit 215 of the native layer 202 converts the decoded data into RGB data in step S1016, and requests the OS layer 203 to stop the indicator in step S1017. In step S1018, the OS layer 203 stops the indicator and stops the display on the display.

[Printing]

Figure 11:
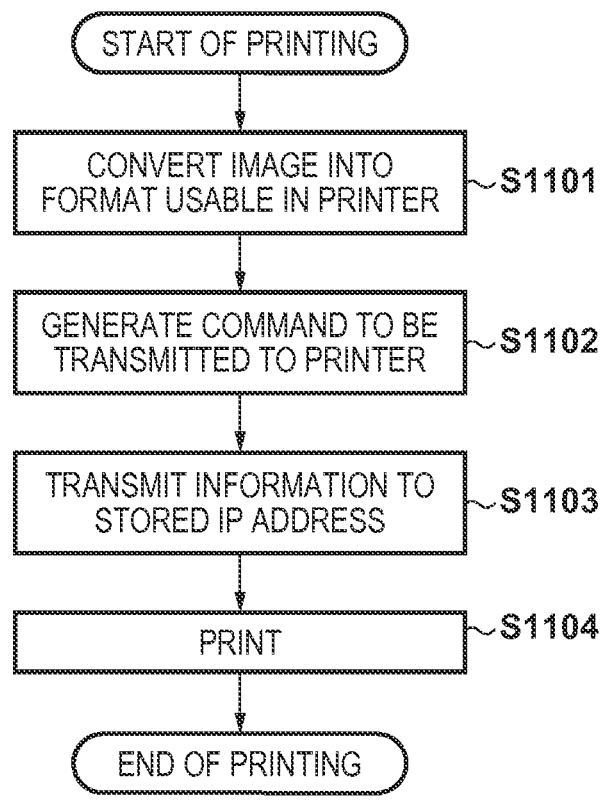
FIG. 11 is a flowchart showing print processing in step S308.

After the processing in step S1018 ends, the processing in step S308 starts. FIG. 11 is a flowchart showing the print processing in step S308.

In step S1101, the printer data generation unit 215 of the native layer 202 converts the RGB data converted in step S1016 into a data format processable by the printer 115 based on the print information obtained in step S910. Data formats processable by the printer 115 vary from a standard format (for example, JPEG) to a vendor-specific format. Any of these data formats is available here.

In step S1102, the printer data generation unit 215 of the native layer 202 generates a command to be transmitted to the printer 115 based on the print information and the RGB data generated in step S1101.

In step S1103, the printer data generation unit 215 of the native layer 202 transmits the command generated in step S1102 via the printer communication unit 217 of the OS layer 203 in accordance with a communication protocol supportable by the printer 115. At this time, the transmission destination is the IP address stored in step S903.

In step S1104, the printer 115 starts printing and outputs a printed product.

As described above, according to the first embodiment, the image loading unit 205 of the native layer 202 rasterizes image data. After rasterizing the image data, the native layer 202 converts the image data into the base64 data format interpretable by the script layer 201 via the data conversion unit 207, and transmits the converted image data to the script layer 201. The script layer 201 can perform drawing on the UI screen and rendering processing based on the image data by using the image data in the base64 data format received according to the procedures in the first embodiment.

Second Embodiment

In the first embodiment, the image loading unit 205 of the native layer 202 obtains image data from the image set 206.

The script layer 201 receives the image data from the native layer 202, and can perform rendering based on the image data at the time of printing.

In the second embodiment, image data for display is obtained in a script layer 201, and image data for processing (for example, print processing) is held in a native layer 202.

In the second embodiment, the script layer 201 refers to image data to be used for display based on the file path, unlike the first embodiment. In contrast, the native layer 202 obtains image data, as in the first embodiment, and performs rendering processing.

Figure 16:
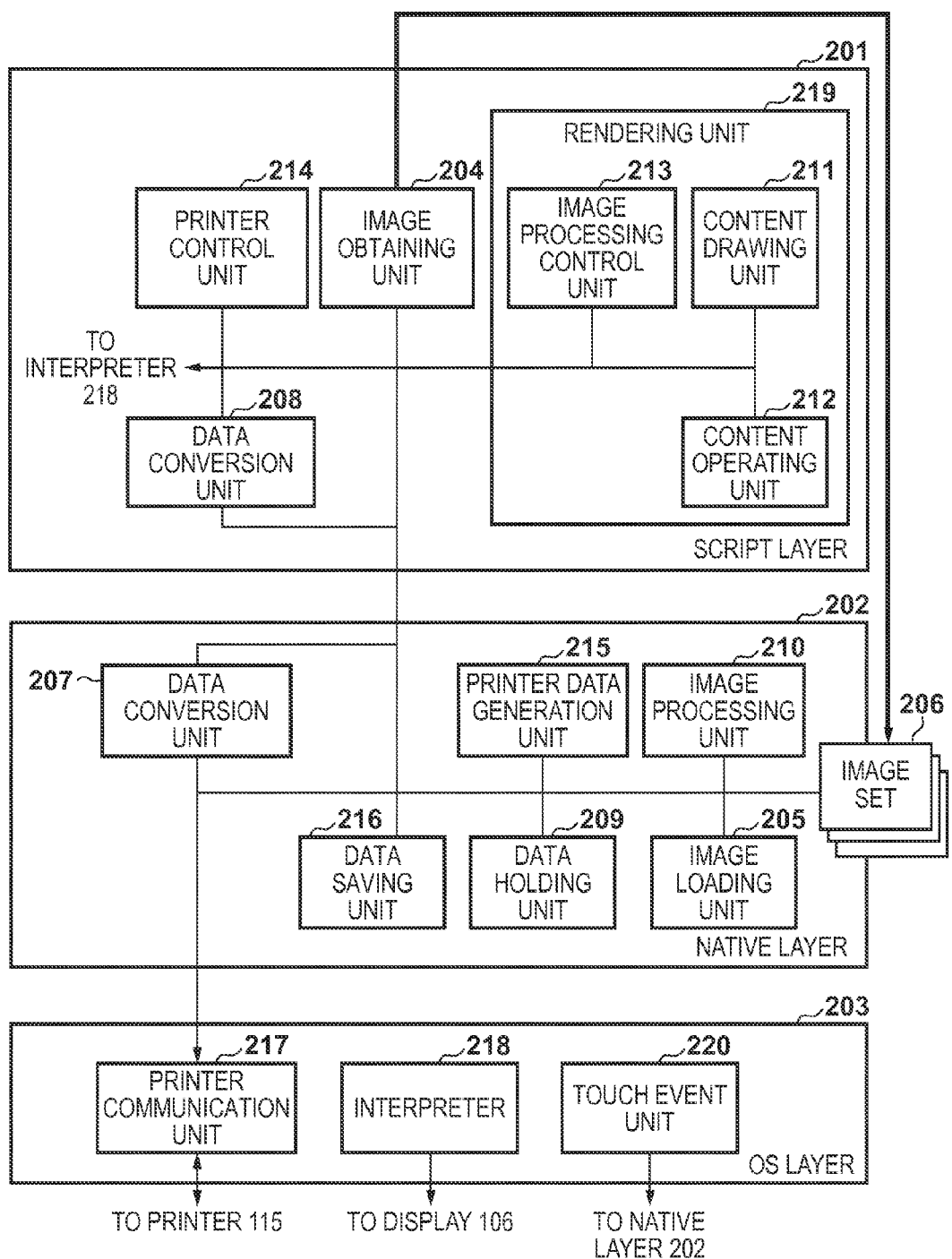
FIG. 16 is a block diagram showing another example of the software arrangement of the portable information terminal.

FIG. 16 is a block diagram showing an example of a software arrangement on a portable information terminal 100 according to this embodiment. A difference from FIG. 2 is that an image obtaining unit 204 of the script layer 201 accesses an image set 206 without the intervention of the native layer 202. Image data obtained by the image obtaining unit 204 through this route is used "for display". An image loading unit 205 of the native layer 202 accesses the image set 206 to obtain image data, and the image data is stored as RGB data in a data holding unit 209. The image data obtained through this route is used "for processing".

When an image processing event such as printing occurs, the script layer converts the instruction content of the image processing event into the JSON data format by a data conversion unit 208, and transmits the converted instruction content to the native layer 202. Based on the instruction content transmitted after conversion into the JSON data format, an image processing unit 210 of the native layer 202 performs image processing on RGB data stored in the data holding unit 209. A data saving unit 216 saves the RGB data having undergone the image processing. The save location may be another location as long as the native layer 202 can access this area.

In the script layer 201, the image "for display" which is displayed on the UI is updated by sequentially changing the reference destination file path of the display image into the file path of the image data having undergone image processing. A print rendering event is also executed according to the same procedures as those for the image processing event.

A difference from the first embodiment will be explained below.

[Photo Image Selection]

Figure 17:
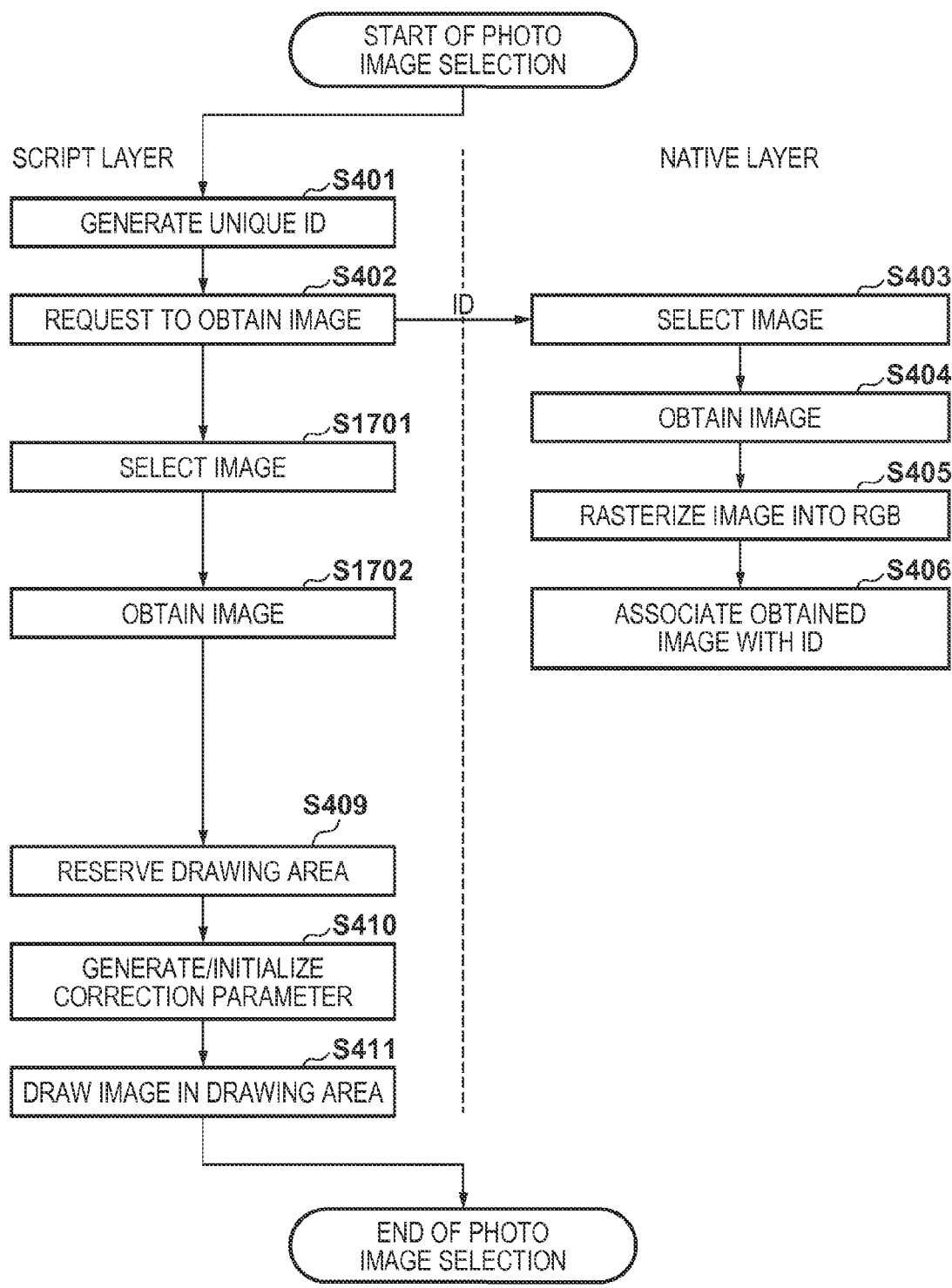
FIG. 17 is a flowchart showing another example of photo image selection processing.

FIG. 17 is a flowchart showing photo image selection processing according to this embodiment. FIG. 17 is different from FIG. 4 in steps S1701 and S1702.

The image obtaining unit 204 of the script layer 201 selects image data for display from the image set 206 in step S1701, and obtains the selected image data as an Image object in step S1702. In this manner, the image data for display is obtained as an Image object in this embodiment. The script layer 201 performs processing of displaying the Image object "for display" on the UI screen via an interpreter 218 of an OS layer 203 according to the same procedures as those in the first embodiment.

The native layer 202 obtains RGB data "for processing", as in the first embodiment. However, unlike the first embodiment, the native layer 202 does not perform processing of converting RGB data into a format interpretable by the script layer 201 and transmitting it. The Image object to undergo display processing by the script layer 201, and the RGB data to undergo rasterization processing by the native layer 202 are associated by a unique ID.

[Image Processing]

Figure 18:
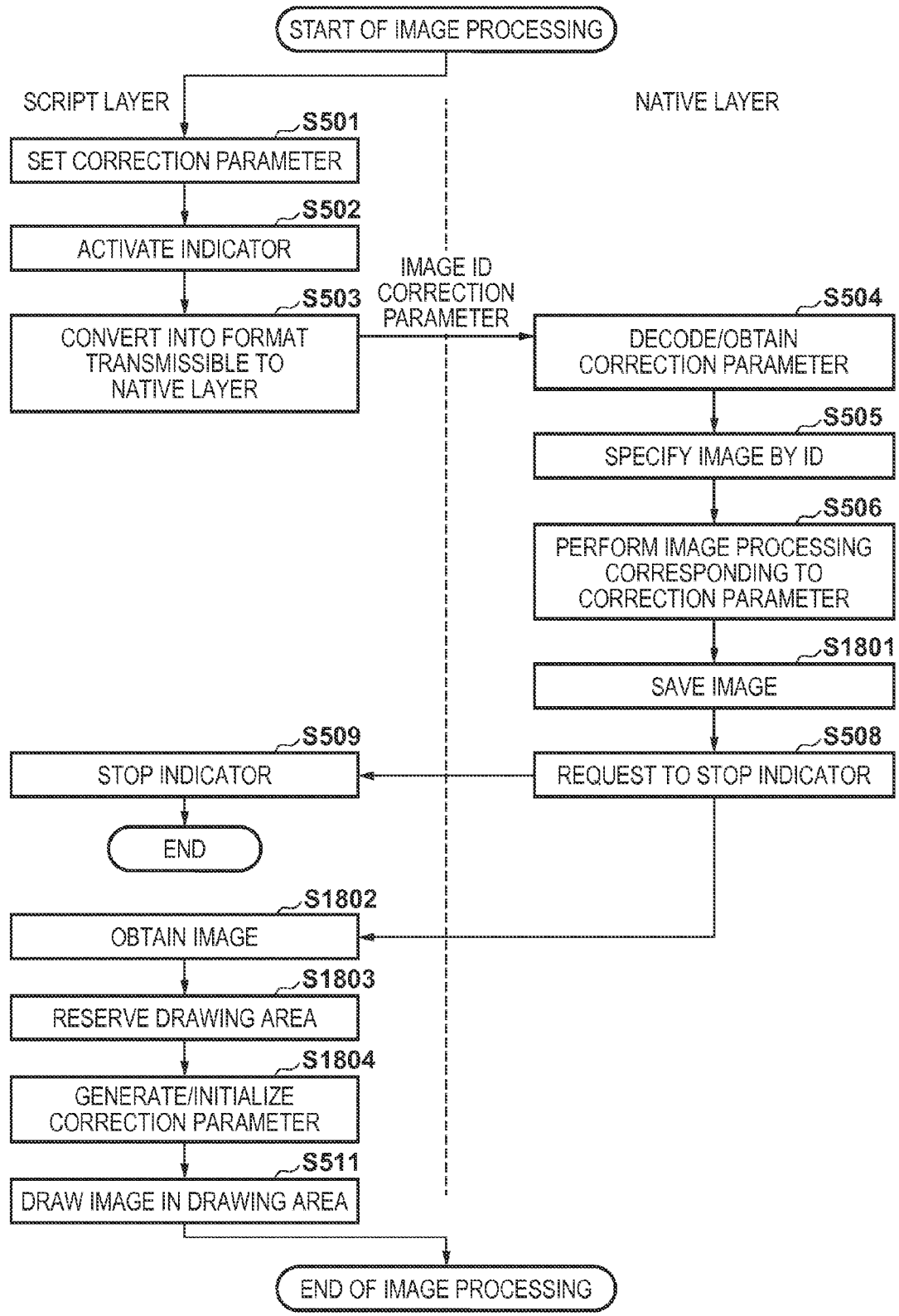
FIG. 18 is a flowchart showing another example of image processing.

FIG. 18 is a flowchart showing image processing according to this embodiment. FIG. 18 is different from FIG. 5 in steps S1801 to S1804.

In step S1801, the data saving unit 216 of the native layer 202 saves RGB data "for processing" having undergone image processing by the image processing unit 210.

In step S1802, the image obtaining unit 204 of the script layer 201 obtains the file path of the image data (RGB data) saved in step S1801. The file path is transmitted simultaneously when transmitting an indicator stop request to the script layer 201 in step S508. Note that the native layer 202 may transmit the file path to the script layer 201 at the timing before or after the stop of the indicator. If a preprocessed image data name or a save location is stored in the script layer 201, the image obtaining unit 204 of the script layer 201 may use this information.

In step S1803, the script layer 201 reserves in a RAM 103 an area for displaying the image data designated by the file path. For example, the canvas function of the HTML is used to reserve the memory, and the API of the Context object of the canvas is used to draw an image.

In step S1804, an image processing control unit 213 of the script layer 201 generates and initializes a correction parameter. As an initial value at this time, a value (for example, a luminance value) corresponding to the position of a slide bar 1202 is set.

[Stamp Image Addition]

Figure 19:
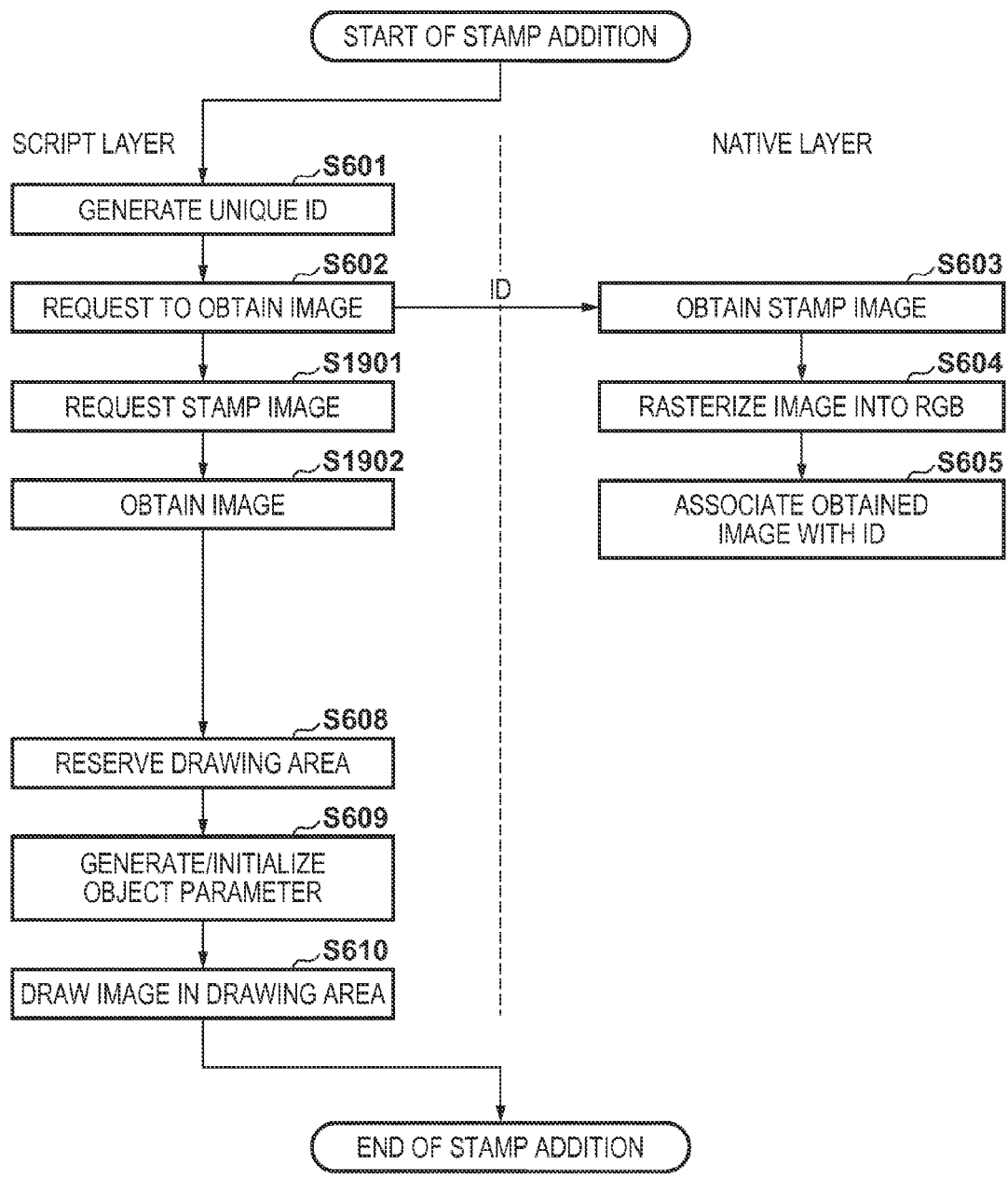
FIG. 19 is a flowchart showing another example of stamp image addition processing.

FIG. 19 is a flowchart showing stamp image addition processing according to this embodiment. FIG. 19 is different from FIG. 6 in steps S1901 and S1902.

The image obtaining unit 204 of the script layer 201 selects stamp image data from the image set 206 in step S1901, and obtains the selected stamp image data as an Image object in step S1902. In this fashion, the stamp image data for display is obtained as an Image object in this embodiment. The script layer 201 performs processing of displaying the Image object "for display" on the UI screen via the interpreter 218 of the OS layer 203 according to the same procedures as those in the first embodiment.

In contrast, the native layer 202 obtains RGB data "for processing", as in the first embodiment. However, unlike the first embodiment, the native layer 202 does not perform processing of converting RGB data into a format interpretable by the script layer 201 and transmitting it. The Image object to undergo display processing by the script layer 201, and the RGB data to undergo rasterization processing by the native layer 202 are associated by a unique ID.

[Rendering]

Figure 20:
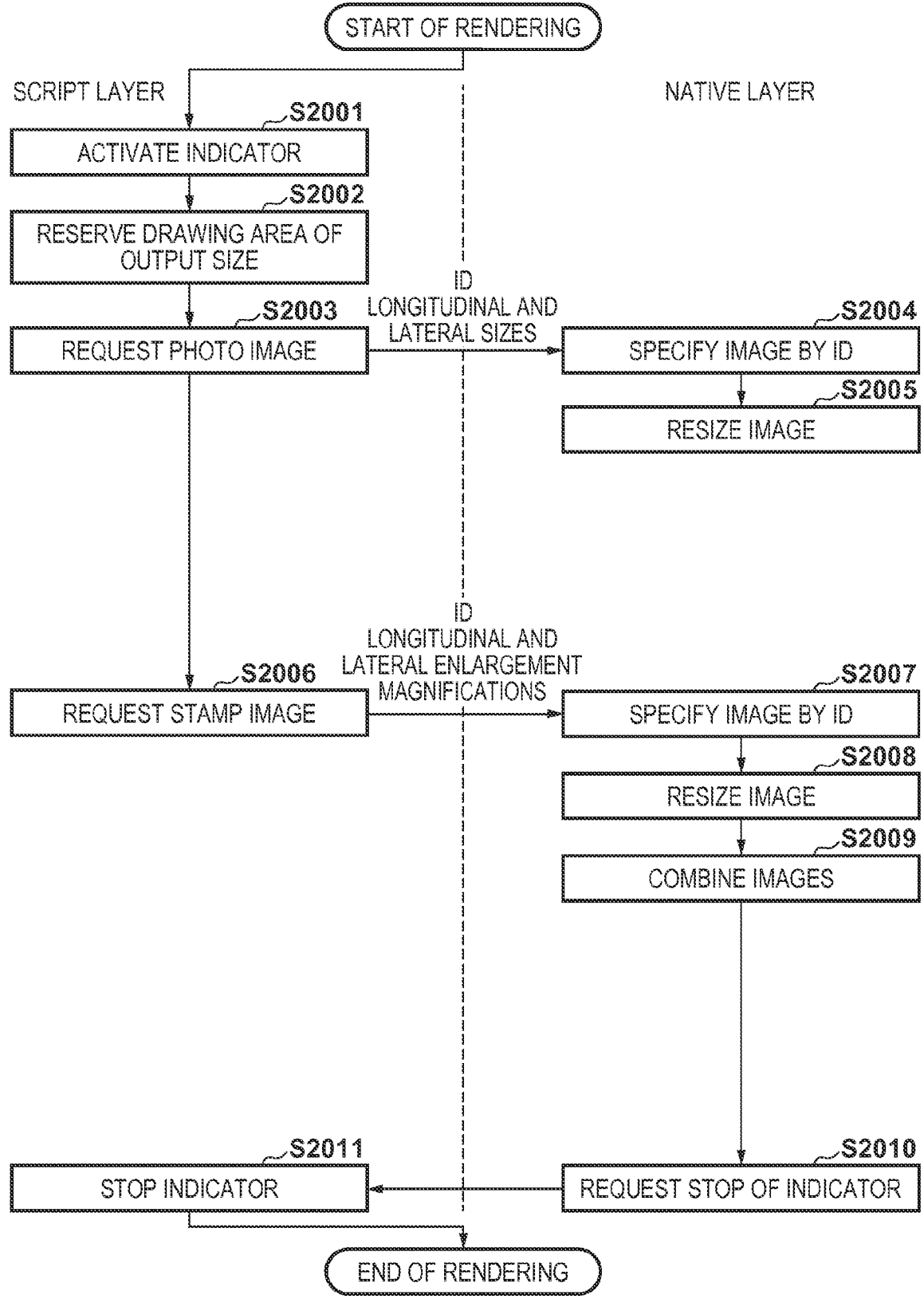
FIG. 20 is a flowchart showing another example of rendering processing.

FIG. 20 is a flowchart showing rendering processing according to this embodiment. When pressing of a setting completion button 1302 of a printer setting UI 1301 by the user is detected, the processing in FIG. 20 starts.

In step S2001, the script layer 201 activates an indicator and displays it on a display 106.

In step S2002, the script layer 201 decides an output size corresponding to a paper size based on print information obtained in step S910, and reserves a drawing area corresponding to the output size in the RAM 103.

In step S2003, the script layer 201 requests the native layer 202 to draw photo image data. At this time, the script layer 201 uses the data conversion unit 208 to convert the ID of the photo image data and information of the lateral and longitudinal sizes of the requested image data, and transmits the converted data to the native layer 202.

In step S2004, the native layer 202 specifies corresponding RGB data "for processing" from the data holding unit 209 based on the ID received from the script layer 201.

In step S2005, the image processing unit 210 of the native layer 202 resizes the RGB data "for processing" specified in step S2004 into the lateral and longitudinal sizes of the image received in step S2003.

In step S2006, upon receiving the completion of resizing the image "for processing" from the native layer 202, the script layer 201 calculates an enlargement magnification from the drawing area 1206 and the size of the output area decided in step S2002. The completion of resizing may be received based on a return value or the like to the processing in step S2003. Thereafter, the script layer 201 transmits object parameter values such as the enlargement magnification and rotation information of the drawing area, and the ID of the stamp image to the native layer 202, and requests the native layer 202 to draw the stamp image data "for processing".

In step S2007, the native layer 202 specifies corresponding RGB data "for processing" from the data holding unit 209 based on the ID received in step S2006.

In step S2008, the native layer 202 resizes/rotates the RGB data "for processing" specified in step S2007 in accordance with the enlargement magnification and rotation information received in step S2006.

In step S2009, the native layer 202 combines the RGB data "for processing" for the photo image and the RGB data "for processing" for the stamp image. At this time, the combination position of the stamp image is decided by calculating a position relative to the photo image based on the object parameter values.

In step S2010, the native layer 202 requests the script layer 201 to stop the indicator. In step S2011, the script layer 201 stops the indicator and stops the display on the display.

As described above, according to the second embodiment, image processing such as scaling is performed on RGB data "for processing" held in the native layer 202. In other words, neither image processing nor print rendering is performed on image data "for display" obtained by path designation in the script layer 201. In a software arrangement as shown in FIG. 16, therefore, image processing and print rendering based on image data can be reliably performed. In the second embodiment, at the time of an image processing event and the time of print rendering, a data conversion unit 207 of the native layer 202 does not perform processing of converting image data "for processing" into the base64 data format. As a result, the processing speed can be further increased.

Third Embodiment

Figure 21:
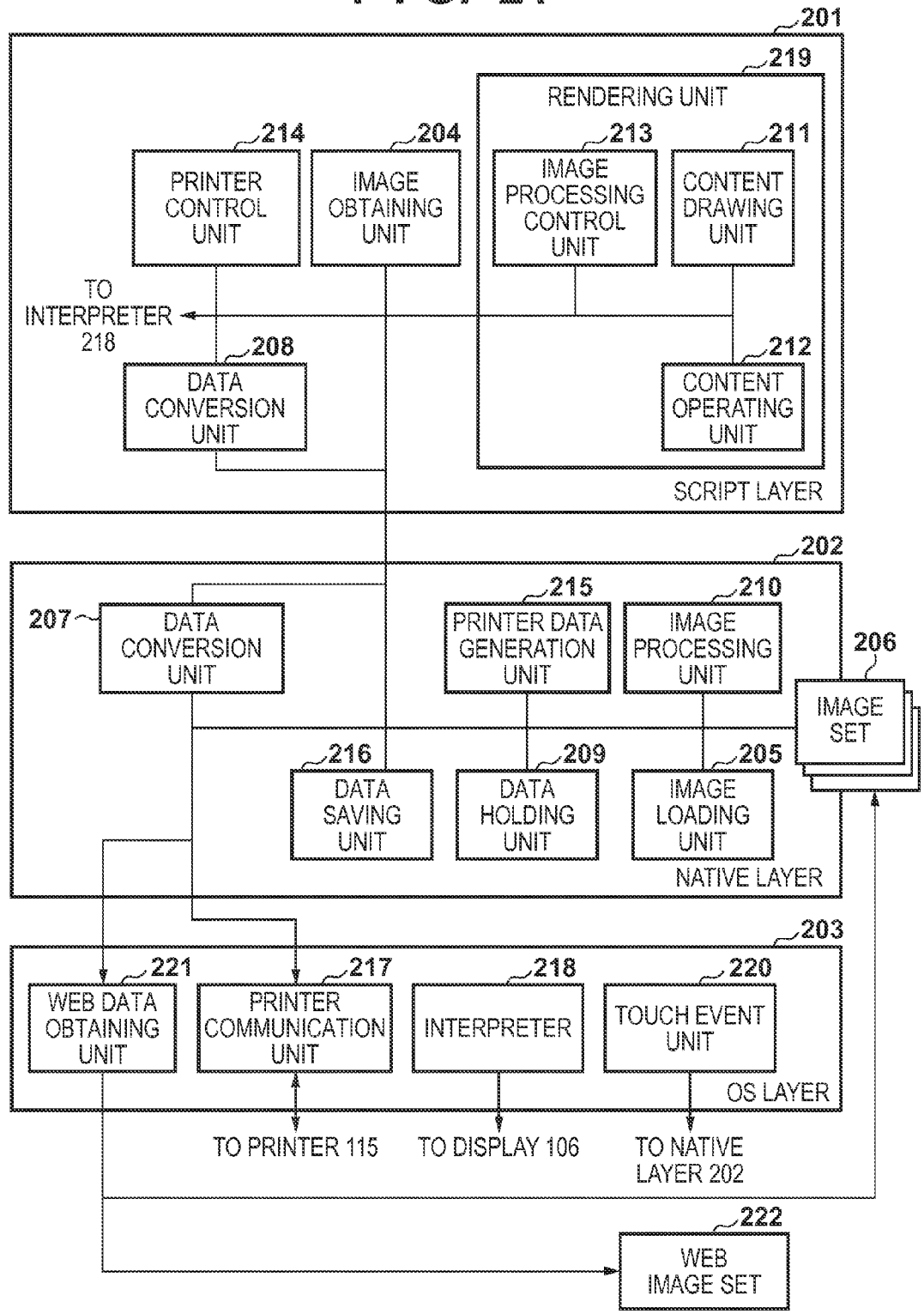
FIG. 21 is a block diagram showing another example of the software arrangement of the portable information terminal.

FIG. 21 is a block diagram showing the software arrangement of a portable information terminal 100 according to this embodiment. FIG. 21 is different from FIG. 2 in a Web data obtaining unit 221 of an OS layer 203. In this embodiment, photo image data selectable by the user is saved not in the portable information terminal 100, as in the first and second embodiments, but in a Web image set 222.

When the user selects a photo image on a Web site, an image obtaining unit 204 of a script layer 201 instructs a native layer 202 to obtain an image. Upon receiving the image obtaining instruction, the native layer 202 accesses, via the Web data obtaining unit 221 of the OS layer 203, the Web site where the Web image set 222 exists. The communication method at this time is not particularly limited.

The Web data obtaining unit 221 obtains image data from the Web image set 222, and saves the obtained image data in an image set 206 accessible by the native layer 202. After that, an image loading unit 205 of the native layer 202 obtains the image data obtained from the Web site, as in the first embodiment.

[Photo Image Selection]

Figure 22:
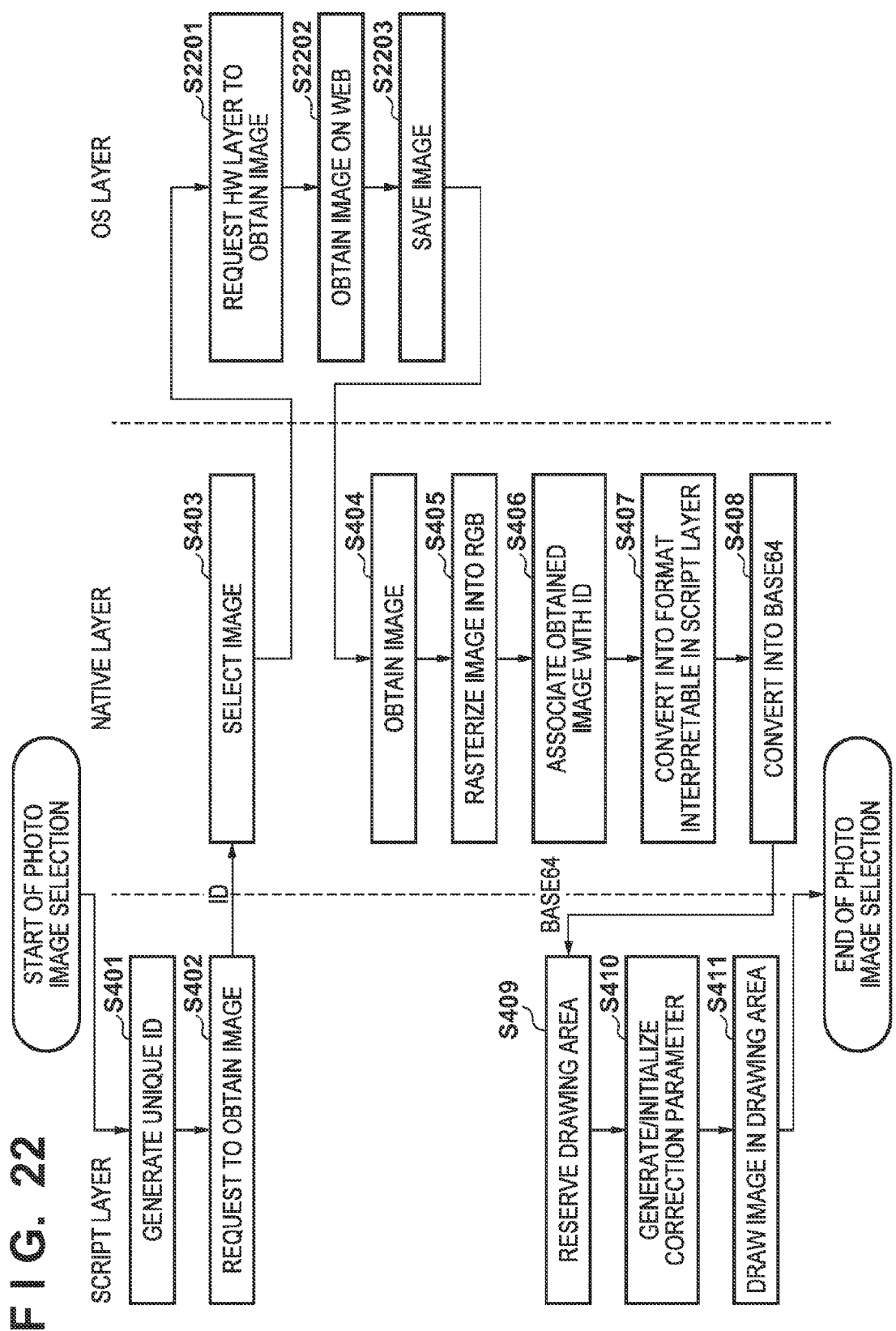
FIG. 22 is a flowchart showing another example of photo image selection processing.

FIG. 22 is a flowchart showing photo image selection processing according to this embodiment. FIG. 22 is different from FIG. 4 in steps S2201 to S2203.

In step S2201, the native layer 202 requests the OS layer 203 to obtain an image (Web image set 222) on a Web site.

In step S2202, the Web data obtaining unit 221 of the OS layer 203 downloads the image on the Web site.

In step S2203, the Web data obtaining unit 221 of the OS layer 203 saves the downloaded image in the image set 206. Note that the save destination may be a data saving unit 216. Then, the native layer 202 rasterizes the saved image data, as in the first embodiment.

As described above, according to the third embodiment, it is possible to load even image data on a Web site by the native layer 202, convert it into base64 data, transfer the base64 data to the script layer 201, and perform display and rendering at the time of printing, as in the first embodiment.

Also, the operation described in the second embodiment may be applied. More specifically, the image obtaining unit 204 of the script layer 201 may obtain image data saved in the image set 206 as image data "for display", and the image loading unit 205 of the native layer 202 may obtain it as image data "for processing".

Fourth Embodiment

In the fourth embodiment, image data is not kept held on memory, but when the image data is not used, is saved as a temporary file in a secondary storage device 104 (data saving unit 216). Upon receiving an image processing request from an image processing control unit 213 of a script layer 201, an image loading unit 205 of a native layer 202 loads the temporary file in the data saving unit 216. An image processing unit 210 of the native layer 202 then performs image processing on RGB data corresponding to the temporary file.

[Photo Image Selection]

Figure 23:
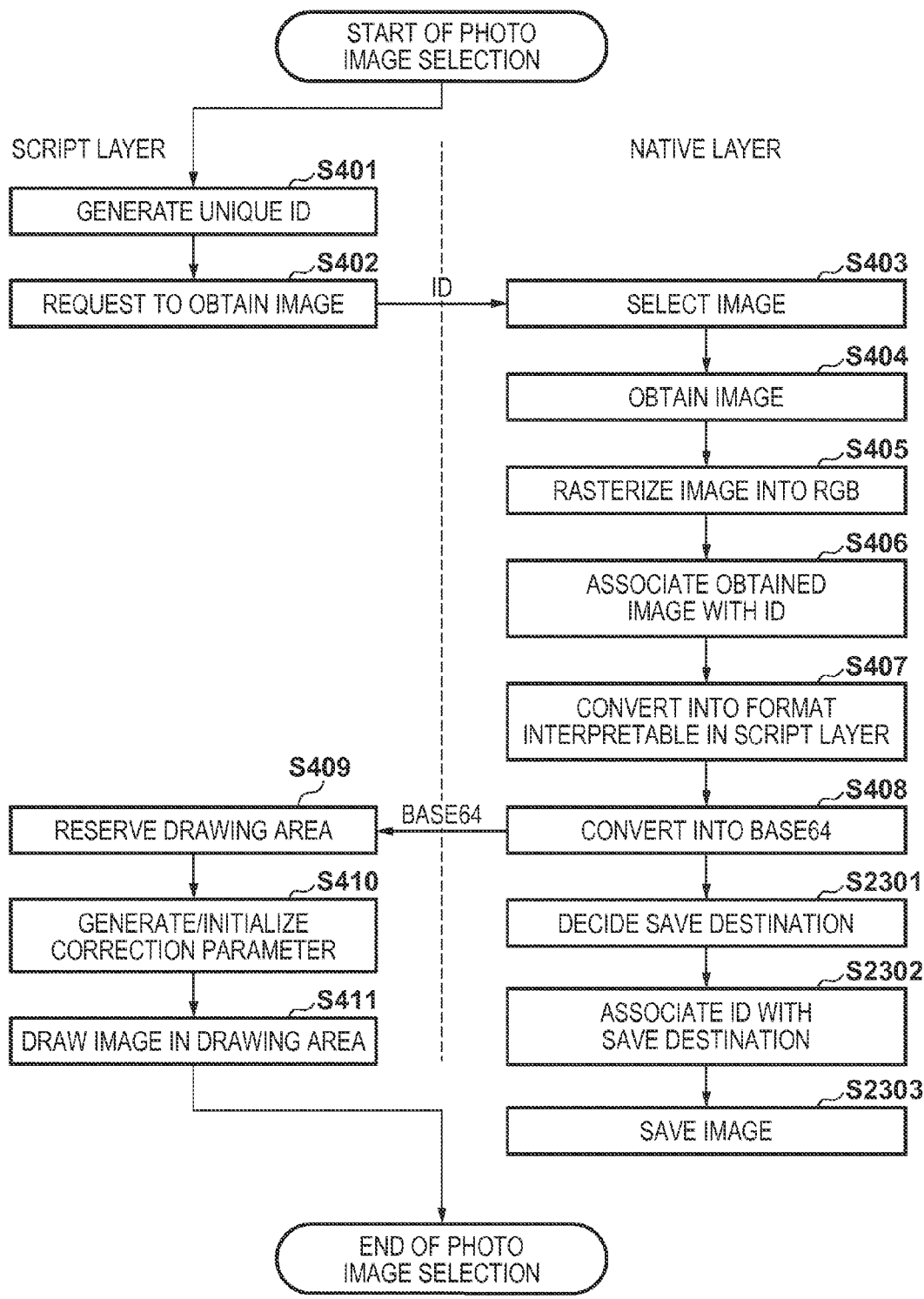
FIG. 23 is a flowchart showing another example of photo image selection processing.

FIG. 23 is a flowchart showing photo image selection processing according to this embodiment. FIG. 23 is different from FIG. 4 in steps S2301 to S2303.

In step S2301, the native layer 202 decides a save destination for saving RGB data as a temporary file. As the save destination, a save location accessible by the native layer 202 is decided. For example, the data saving unit 216 or an image set 206 of the native layer 202 is decided as the save destination.

In step S2302, the native layer 202 associates an ID generated by the script layer 201 for selection target image data (RGB data) in FIG. 23 with the RGB data save destination obtained by the native layer 202.

In step S2303, the native layer 202 saves the RGB data as a temporary file. Here, the save format is not particularly limited as long as it is a general-purpose file format.

[Image Processing]

Figure 24:
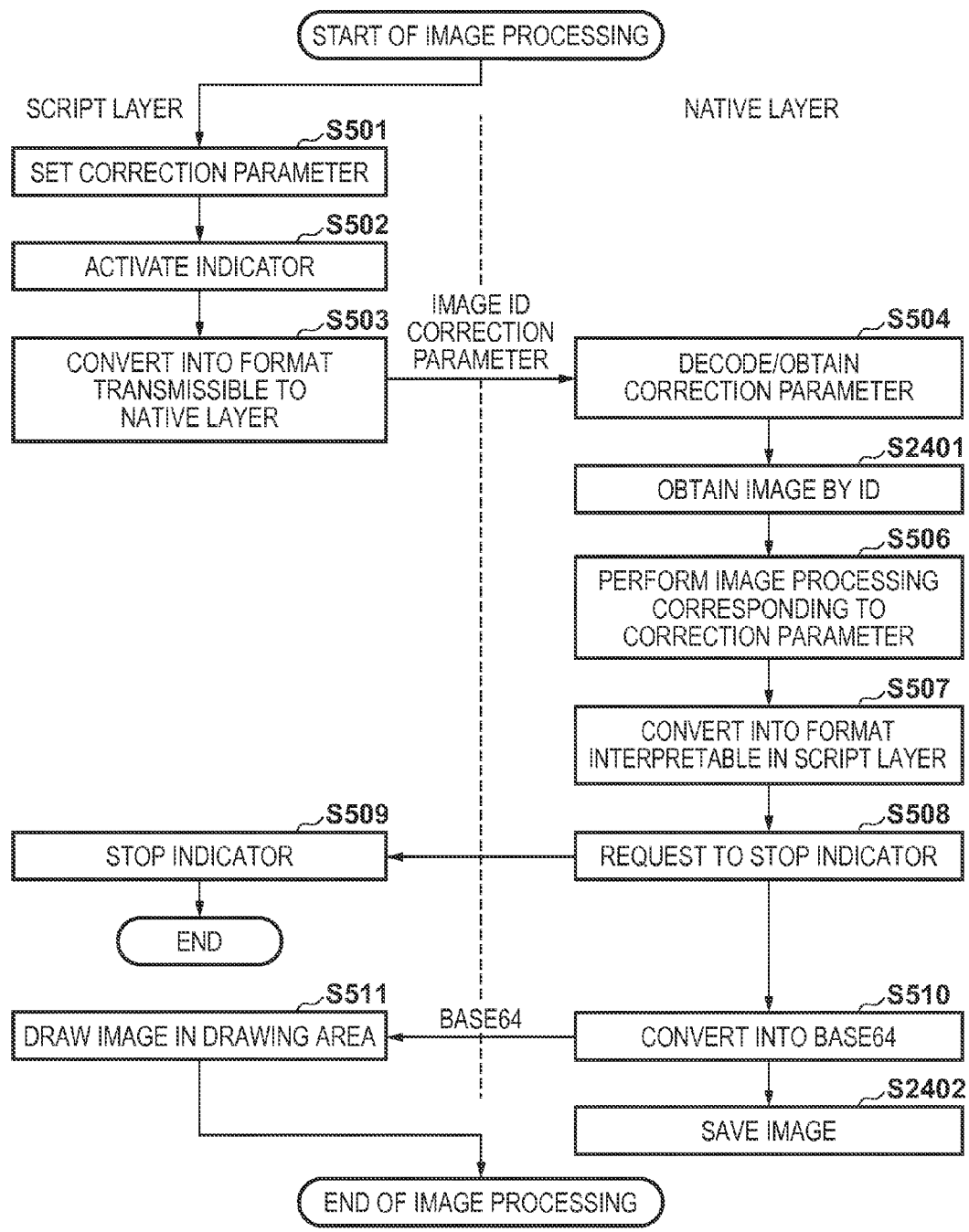
FIG. 24 is a flowchart showing another example of image processing.

FIG. 24 is a flowchart showing image processing according to this embodiment. FIG. 24 is different from FIG. 5 in steps S2401 to S2402.

In this embodiment, the native layer 202 does not hold image data in a RAM 103. In step S2401, therefore, the native layer 202 obtains the path of the temporary file associated with the ID. After obtaining image data from the temporary file, the image processing unit 210 performs image processing, a data conversion unit 207 converts the image data into the base64 data format, and the converted image data is transmitted to the script layer 201, as in the first embodiment.

In step S2402, the native layer 202 saves the RGB data as a temporary file. At this time, the temporary file already saved in the data saving unit 216 is overwritten and updated.

[Stamp Image Addition]

Figure 25:
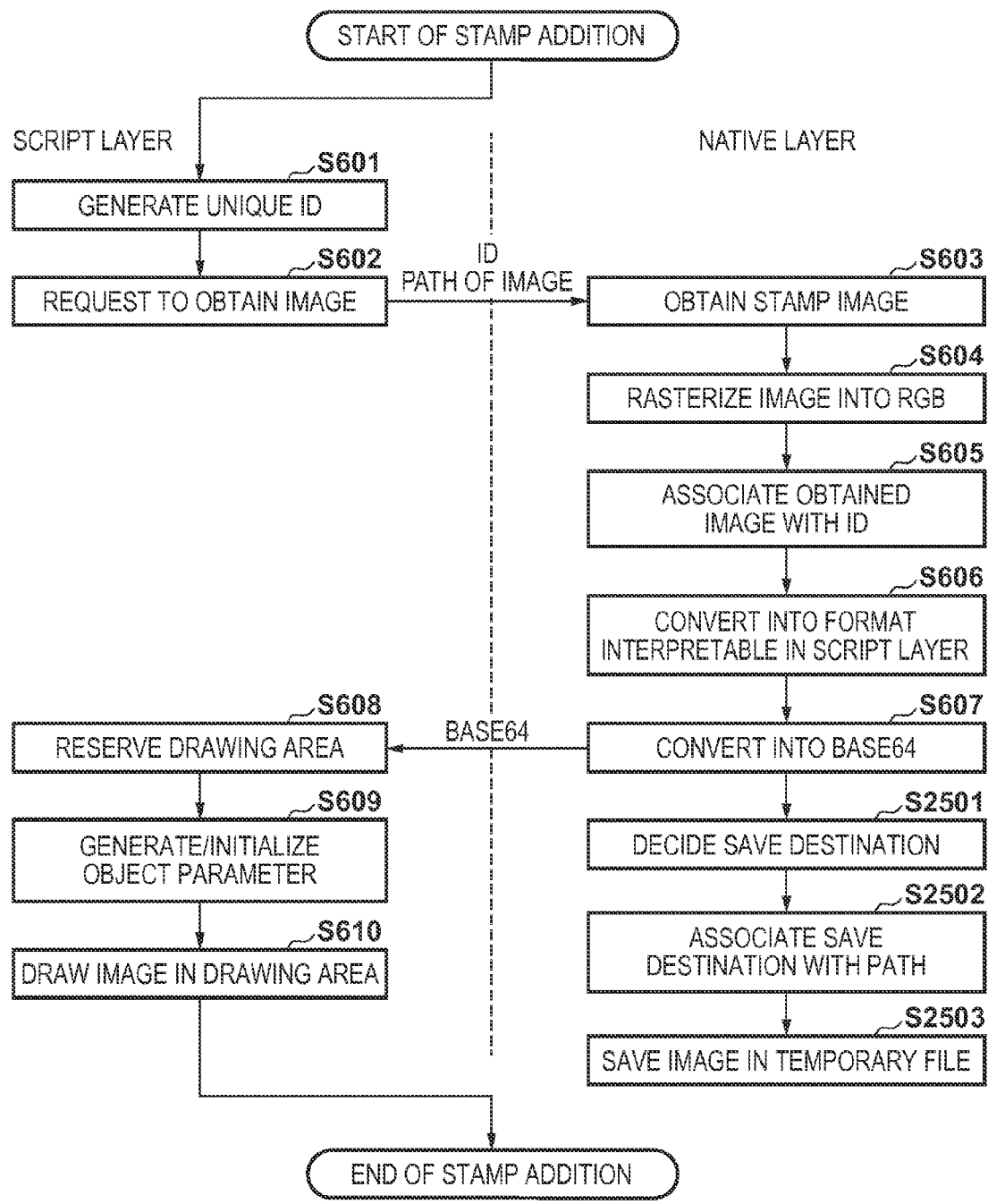
FIG. 25 is a flowchart showing another example of stamp image addition processing.

FIG. 25 is a flowchart showing stamp image addition processing according to this embodiment. FIG. 25 is different from FIG. 6 in steps S2501 to S2503.

In step S2501, the native layer 202 decides a save destination for saving RGB data for a stamp image as a temporary file. As the save destination, a save location accessible by the native layer 202 is decided. For example, the data saving unit 216 or image set 206 of the native layer 202 is decided as the save destination.

In step S2502, the native layer 202 associates an ID generated by the script layer 201 for RGB data of the stamp image with the RGB data save destination obtained by the native layer 202.

In step S2503, the native layer 202 saves the RGB data as a temporary file. Here, the save format is not particularly limited as long as it is a general-purpose file format.

As described above, according to the fourth embodiment, when image data is not used, it is temporarily saved as a temporary file and rasterized only when needed. As a result, a data holding unit 209 of the native layer 202 need not keep holding the image data, and the use memory of the RAM 103 can be used efficiently.

Also, the operation in the second embodiment may be applied. More specifically, an image obtaining unit 204 of the script layer 201 may obtain a temporary file saved in the data saving unit 216 as image data "for display", and the image loading unit 205 of the native layer 202 may obtain it as image data "for processing".

Note that the above embodiments have described an example in which image data on a Web site is obtained in the native layer 202. However, the present invention is not limited to this, and image data accessible offline may be obtained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-135177, filed Jun. 30, 2014, which is hereby incorporated by reference herein in its entirety.

What is claimed is:

1. An information processing apparatus comprising:
   a processor;
   a storage unit configured to store a program having a layered structure including (1) a first layer constituted by a script instruction set which is translated to be able to execute the script instruction set by the processor when executing an application, and (2) a second layer constituted by an instruction set executable by the processor, the processor executing the application by cooperation between the first layer and the second layer;
   wherein the processor functions as units comprising:
   (a) an obtaining unit configured to, when performing image processing on a designated image by a function of the application, obtain image data of the designated image in the second layer;
   (b) a generation unit configured to generate, in the first layer, a print script of print content including the image data which has been obtained by the obtaining unit and converted into a data format interpretable by the first layer in the second layer; and
   (c) a rendering unit configured to render the print script into print image data corresponding to a print resolution by interpreting the print script generated by the generation unit,
   wherein the rendering unit generates the print image data by obtaining an output image size based on printing paper information, and enlarging or reducing the image data included in the print script in accordance with the obtained output image size.

2. An information processing method to be executed in an apparatus which executes a program having a layered structure including (1) a first layer constituted by a script instruction set which is translated to be able to execute the script instruction set by a processor when executing an application, and (2) a second layer constituted by an instruction set executable by the processor, the processor executing the application by cooperation between the first layer and the second layer, the information processing method comprising:
   an obtaining step of, when performing image processing on a designated image by a function of the application, obtaining image data of the designated image in the second layer;
   a generation step of generating, in the first layer, a print script of print content including the image data which has been obtained in the obtaining step and converted into a data format interpretable by the first layer in the second layer; and
   a rendering step of rendering the print script into print image data corresponding to a print resolution by interpreting the print script generated in the generation step,
   wherein, in the rendering step, the print image data is generated by obtaining an output image size based on printing paper information, and enlarging or reducing the image data included in the print script in accordance with the obtained output image size.

3. The information processing method according to claim 2, wherein, in the rendering step, the print script is rendered in the second layer.

4. The information processing method according to claim 2, further comprising a conversion step of converting, in the second layer, the image data obtained in the obtaining step into the data format interpretable by the first layer,
   wherein the generation step generates, in the first layer, the print script including the image data whose data format has been converted in the conversion step.

5. The information processing method according to claim 2, wherein the first layer is described by at least one of HTML5 and JavaScript.

6. The information processing method according to claim 2, wherein the obtaining step obtains one of image data on a Web site and image data accessible offline.

7. The information processing method according to claim 2, further comprising:
   a saving step of saving the image data obtained in the obtaining step; and
   an acceptance step of accepting, in the first layer, an instruction to execute the image processing,
   wherein when the acceptance step accepts the instruction to execute the image processing, the generation step obtains the image data saved in the saving step in the data format interpretable by the first layer, and generates the print script.

8. An information processing apparatus comprising:
   a processor;
   a storage unit configured to store a program having a layered structure including (1) a first layer constituted by a script instruction set which is translated to be able to execute the script instruction set by the processor when executing an application, and (2) a second layer constituted by an instruction set which is translated in advance to be able to execute the instruction set by the processor, the processor executing the application by cooperation between the first layer and the second layer;
   wherein the processor functions as units comprising:
   (a) an obtaining unit configured to obtain image data of a designated image in the second layer;
   (b) a receiving unit configured to receive, in the first layer from the second layer, image data which corresponds to the image data obtained by the obtaining unit and has a data format interpretable by the first layer, wherein the image data having the data format is acquired by conversion of data format done in the second layer;
   (c) a display control unit configured to cause a display apparatus to display an image based on the received image data, in the first layer;
   (d) a generation unit configured to generate, in the first layer, a print script of print content including specification information for specifying the image data which has been obtained by the obtaining unit; and
   (e) a rendering unit configured to render the image data which has been obtained by the obtaining unit into print image data corresponding to a print resolution by specifying the image data based on the specification information included in the print script generated by the generation unit.

9. An information processing method to be executed in an information processing apparatus including: (a) a processor, and (b) a storage unit configured to store a program having a layered structure including (1) a first layer constituted by a script instruction set which is translated to be able to execute the script instruction set by the processor when executing an application, and (2) a second layer constituted by an instruction set which is translated in advance to be able to execute the instruction set by the processor, the processor executing the application by cooperation between the first layer and the second layer, the information processing method comprising:
  an obtaining step of obtaining image data of a designated image in the second layer;
  a receiving step of receiving, in the first layer from the second layer, image data which corresponds to the image data obtained in the obtaining step and has a data format interpretable by the first layer, wherein the image data having the data format is acquired by conversion of data format done in the second layer;
  a display control step of causing a display apparatus to display an image based on the received image data, in the first layer;
  a generation step of generating, in the first layer, a print script of print content including specification information for specifying the image data which has been obtained in the obtaining step; and
  a rendering step of rendering the image data which has been obtained in the obtaining step into print image data corresponding to a print resolution by specifying the image data based on the specification information included in the print script generated in the generation step.

10. The information processing method according to claim 9, wherein in the rendering step, the image data is rendered in the second layer.

11. The information processing method according to claim 9, wherein when print processing is instructed in the first layer, the image data is rendered in the second layer in the rendering step.

12. The information processing method according to claim 9, wherein when display processing is instructed in the first layer, the display control step causes the display apparatus to display the image based on the received image data, in the first layer.

13. The information processing method according to claim 12, wherein when the first layer is described by JavaScript, the display processing is instructed by using a canvas.

14. The information processing method according to claim 9, further comprising a conversion step of converting, in the second layer, the image data obtained in the obtaining step into the data format interpretable by the first layer,
  wherein the receiving step receives, in the first layer from the second layer, the image data whose data format has been converted in the conversion step.

15. The information processing method according to claim 9, wherein the first layer is described by at least one of HTML5 and JavaScript.

16. The information processing method according to claim 9, wherein the obtaining step obtains one of image data on a Web site and image data accessible offline.

17. The information processing method according to claim 9, further comprising:
  a saving step of saving the image data obtained in the obtaining step; and
  an acceptance step of accepting, in the first layer, an instruction to execute image processing,
  wherein when the acceptance step accepts the instruction to execute the image processing, the receiving step receives the image data saved in the saving step in the data format interpretable by the first layer.

18. An information processing method to be executed in an information processing apparatus including: (a) a processor, and (b) a storage unit configured to store a program having a layered structure including (1) a first layer constituted by a script instruction set which is translated to be able to execute the script instruction set by the processor when executing an application, and (2) a second layer constituted by an instruction set which is translated in advance to be able to execute the instruction set by the processor, the processor executing the application by cooperation between the first layer and the second layer, the information processing method comprising:
  an obtaining step of obtaining image data of a designated image, in the second layer;
  a rasterizing step of rasterizing the image data obtained in the obtaining step, in the second layer;
  a converting step of converting the rasterized image data into data of a data format interpretable by the first layer, in the second layer; and
  an instruction step of receiving the data from the second layer, and instructing predetermined processing based on the received data, wherein the receiving and the instructing are performed in the first layer.

19. The information processing method according to claim 18, wherein the predetermined processing is print processing.

20. The information processing method according to claim 18, wherein the predetermined processing is at least one of brightness correction, monochrome conversion, sepia conversion, ImageFix, RedeyeFix, and SmartSkin.

* * * * *